United States Patent
Okumura et al.

(10) Patent No.: US 12,107,904 B2
(45) Date of Patent: Oct. 1, 2024

(54) INFORMATION PROCESSING APPARATUS, INFORMATION PROCESSING SYSTEM, COMMUNICATION SUPPORT SYSTEM, INFORMATION PROCESSING METHOD, AND NON-TRANSITORY RECORDING MEDIUM

(71) Applicants: Soh Okumura, Land Rheinland-Pfalz (DE); Yuuta Yoshino, Kanagawa (JP)

(72) Inventors: Soh Okumura, Land Rheinland-Pfalz (DE); Yuuta Yoshino, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/122,719

(22) Filed: Mar. 17, 2023

(65) Prior Publication Data
US 2023/0328117 A1   Oct. 12, 2023

(30) Foreign Application Priority Data
Mar. 22, 2022   (JP) ................................ 2022-046141

(51) Int. Cl.
*H04L 65/403* (2022.01)
*H04L 65/1083* (2022.01)
*H04L 67/50* (2022.01)

(52) U.S. Cl.
CPC ........ *H04L 65/1083* (2013.01); *H04L 65/403* (2013.01); *H04L 67/535* (2022.05)

(58) Field of Classification Search
CPC .. H04L 65/1083; H04L 65/403; H04L 67/535
(Continued)

(56) References Cited

U.S. PATENT DOCUMENTS 8,392,503 B2 *   3/2013   Kuhlke ............... H04L 12/1822
                                                                      709/204
9,213,705 B1 *   12/2015  Story, Jr. ............. G06F 16/4393
(Continued)

FOREIGN PATENT DOCUMENTS

JP   2012120105 A  *  6/2012
JP   2016-200955        12/2016
(Continued)

OTHER PUBLICATIONS

Extended European Search Report issued Aug. 11, 2023, in corresponding European Patent Application No. 23163112.8.

*Primary Examiner* — Ruolei Zong
(74) *Attorney, Agent, or Firm* — XSENSUS LLP

(57) ABSTRACT

An information processing apparatus, an information processing system, a communication support system, an information processing method, and a non-transitory recording medium. The information processing apparatus acquires participant information related to a particular participant of a plurality of participants in communication, acquired from the particular participant of the plurality of participants participating, acquires attention amount information related to an attention amount of the particular participant of the plurality of participants with respect to information used in the communication, determines presentation information to be presented to the plurality of participants based on the attention amount information of the particular participant, adjusts timing for transmitting the presentation information to one or more other participants of the plurality of participants, and transmits the presentation information to an output device provided for each of the plurality of participants.

19 Claims, 20 Drawing Sheets

(58) Field of Classification Search
USPC .......................................................... 709/204
See application file for complete search history.

(56) References Cited

U.S. PATENT DOCUMENTS

| | | | |
|---|---|---|---|
| 9,881,058 B1* | 1/2018 | Liu | G06F 16/24578 |
| 10,866,719 B1* | 12/2020 | Bulusu | H04L 51/52 |
| 2003/0052911 A1* | 3/2003 | Cohen-Solal | H04L 47/24 |
| | | | 715/738 |
| 2007/0271518 A1* | 11/2007 | Tischer | H04N 21/4532 |
| | | | 715/744 |
| 2007/0271580 A1* | 11/2007 | Tischer | H04H 60/07 |
| | | | 725/35 |
| 2014/0098116 A1* | 4/2014 | Baldwin | G06F 3/017 |
| | | | 345/522 |
| 2014/0363000 A1* | 12/2014 | Bowden | H04R 27/00 |
| | | | 455/2.01 |
| 2020/0133629 A1* | 4/2020 | Pratt | G06F 9/453 |
| 2021/0076002 A1 | 3/2021 | Peters et al. | |
| 2021/0110844 A1 | 4/2021 | Miyake et al. | |
| 2021/0399911 A1* | 12/2021 | Jorasch | H04L 12/1822 |
| 2023/0128024 A1* | 4/2023 | Du | G09B 5/14 |
| | | | 345/419 |

FOREIGN PATENT DOCUMENTS

| | | |
|---|---|---|
| JP | 2017-219989 | 12/2017 |
| JP | 2018-005598 | 1/2018 |
| JP | 2019-215731 | 12/2019 |
| JP | 2020-025221 | 2/2020 |
| JP | 2020-113197 | 7/2020 |
| WO | WO2018/174088 A1 | 9/2018 |

\* cited by examiner

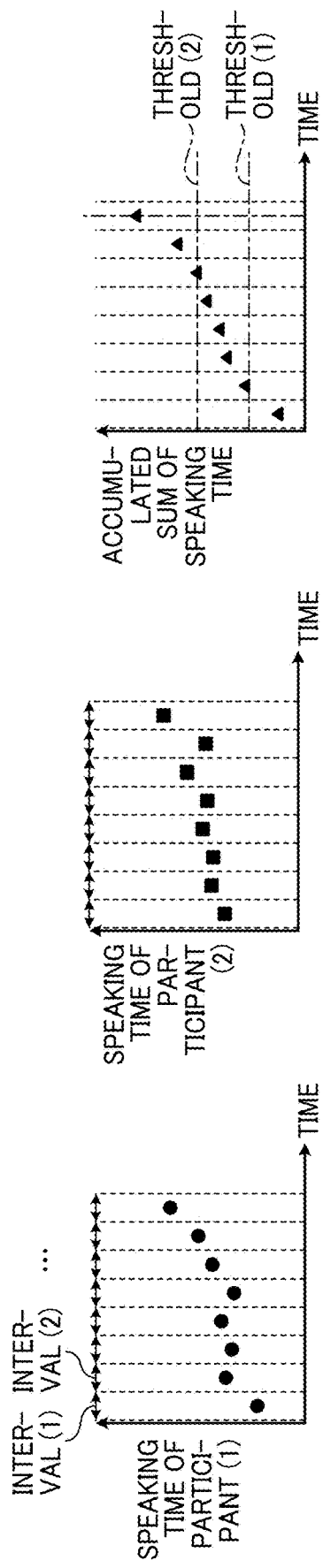
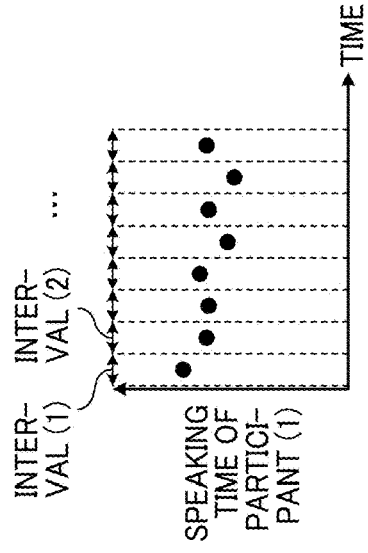

INFORMATION PROCESSING APPARATUS, INFORMATION PROCESSING SYSTEM, COMMUNICATION SUPPORT SYSTEM, INFORMATION PROCESSING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2022-046141, filed on Mar. 22, 2022, in the Japan Patent Office, the entire disclosure of which is hereby incorporated by reference herein.

BACKGROUND

Technical Field

The present disclosure relates to an information processing apparatus, an information processing system, a communication support system, an information processing method, and a non-transitory recording medium.

Background Art

Telecommunication systems have been used in online conversations, conferences, presentations, interviews, and the like through networks. In recent years, the use of telecommunication systems has been increasing, creating a demand for further improvement in quality of communication.

A communication analysis device that analyzes the degree of participation of participants and provides real-time feedback to participants with a low degree of participation using beeps and indicators is disclosed.

SUMMARY

Embodiments of the present disclosure describe an information processing apparatus, an information processing system, a communication support system, an information processing method, and a non-transitory recording medium. The information processing apparatus acquires participant information related to each of a plurality of participants acquired from the plurality of participants participating in communication, acquires attention amount information related to an attention amount of the plurality of participants with respect to information used in the communication, determines presentation information to be presented to the plurality of participants based on the attention amount information, transmits the presentation information to at least one of a display, a speaker, or the like provided for each of the plurality of participants, and adjusts timing for transmitting the presentation information to other participants included in the plurality of participants.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 24A-1 to 24B-3 are diagrams illustrating an example relating to a speaking time threshold of the manual timing selection mechanism.

Figure 1:
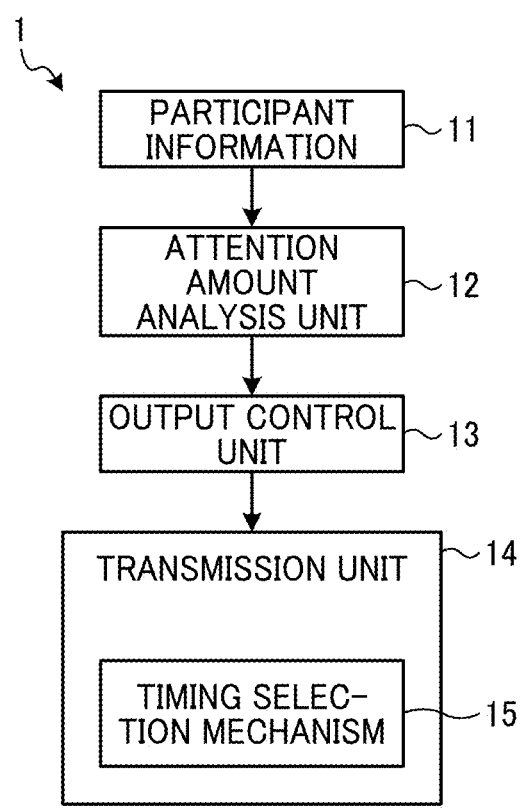
FIG. 1 is a block diagram illustrating an example of a functional configuration of an information processing apparatus according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a description is given of several embodiments of an information processing apparatus, an information processing system, a communication support system, an information processing method, and a non-transitory recording medium. The information processing apparatus according to the present embodiment is applicable to various systems for communicating with a plurality of people, such as conferences, seminars, presentations, interviews, meetings, sales activities, and classes. The information processing apparatus according to the present embodiment is particularly applicable to the communication support system capable of mutually transmitting and receiving information used in communication.

FIG. 1 is a block diagram illustrating an example of a functional configuration of the information processing apparatus according to the present embodiment.

As illustrated in FIG. 1, the information processing apparatus 1 according to the present embodiment includes an information acquisition unit that acquires conversation participant information 11, attention amount analysis unit 12, output control unit 13, and transmission unit 14. These functional units are implemented by a program executed by a processor such as a CPU.

The conversation participant information 11 is participant information relating to participants acquired from participants in communication between a plurality of participants. The participant information is, for example, a camera image or biometric information of the participant. The conversation participant information 11 is acquired by an information acquisition unit.

The attention amount analysis unit 12 acquires attention amount information related to the attention amount of the participant for information used in communication, from the conversation participant information 11 by analyzing the attention amount of the participant. Information used for communication includes speech, display material, gesture, and the like.

The output control unit 13 determines output information m1 based on the attention amount information. The output information m1 corresponds to "presentation information", and the output control unit 13 corresponds to "presentation information determination unit".

The transmission unit 14 includes a timing selection mechanism 15 for selecting transmission timing, and transmits the output information m1 to a presentation unit at a predetermined timing. The presentation unit is any desired output device, such as a display, a speaker, a projector, or the like, which is capable of presenting information to the user.

The attention amount analysis unit 12 estimates or quantifies to what extent the participant is paying attention to the information around the participant. The information surrounding the participant includes visual information, auditory information, tactile information, olfactory information, or gustatory information, which is generally information that can be obtained by human sensory organs.

The output control unit 13 outputs information based on the attention amount obtained by the attention amount analysis unit 12.

The transmission unit 14 transmits the output information obtained by the output control unit 13. The transmission unit 14 is, for example, a light source such as a light bulb, a light emitting diode (LED), a laser, a fluorescent lamp or a neon tube, or a display element such as a cathode ray tube, a plasma display, a liquid crystal display, an organic electro luminescence (EL), or a device for temperature change such as an air conditioner, a peltier element, a heating wire, or a blower, or a vibration generating device such as a piezo-electric element or a motor, or a pressure generating device such as a compressor.

The timing selection mechanism 15 is a mechanism that presents, modulates, adjusts or determines the timing, such as an instant in time, an interval, a period or a frequency, for transmitting the output information m1. In conventional communication analysis devices or support devices, feedback for improving communication may not be sent to participants at proper timing. For example, in a case feedback is sent while the participant is concentrating on communication, the participant's attention to communication is reduced, and the quality of communication is reduced. The timing selection mechanism 15 is a mechanism that adjusts, modulates, or determines the timing of transmitting the output information m1 at an appropriate timing.

Conversation refers to transmission of information, including at least linguistic information, from one person to another by at least two or more people. For example, there are situations in which participants in the conversation talk to each other, and situations in which a particular participant gives a speech to a large number of other participants, such as in a lecture. There may also be a medium for conveying information between participants, such as a microphone, speaker, camera, or video display. Also, the medium may not intervene between all the participants, and may intervene between some of the participants.

Participant information is a general term for information related to the participants in the conversation. For example, social attributes such as an affiliated organization and position and role within organization, physical attributes such as gender and height, heart rate, breathing, gaze, eye movement, skin potential, muscle movement, skin movement, sweat, brain waves, blood oxygen level, stress level, body temperature, biological information such as blinking, video information such as body motions, gestures, postures, habits, etc., voice information such as emotional outbursts, greetings, and speeches, participants' emotions and preferences, and subjective information such as tendencies, characteristics, and personality.

The output information m1 refers to information generated by the attention amount and output control unit 13. The output information m1 includes information such as a type of attention paid by the participant, the amount, frequency, interval, and duration of attention. The output information m1 is the medium that humans can perceive using sight, hearing, touch, smell, taste, etc. The output information m1 includes information for spatial and temporal changes of, for example, light, color, sound, temperature, smell, taste, vibration, pressure, and the like. Examples of the output information m1 includes, an electrical signal to cause a flashing light or a change in light color, electrical signals and discrete numerical arrays for generating image information and video information, electrical signals that changes the pitch or volume of a sound, the air around the skin and humans by heat exchange, electrical signals for cooling and heating objects in contact with humans, change in odor due to the diffusion of molecules into the air, vibration to the skin by a vibrator, and electrical signals for performing hydraulic, pneumatic, or water pressure on the skin.

Figure 2:
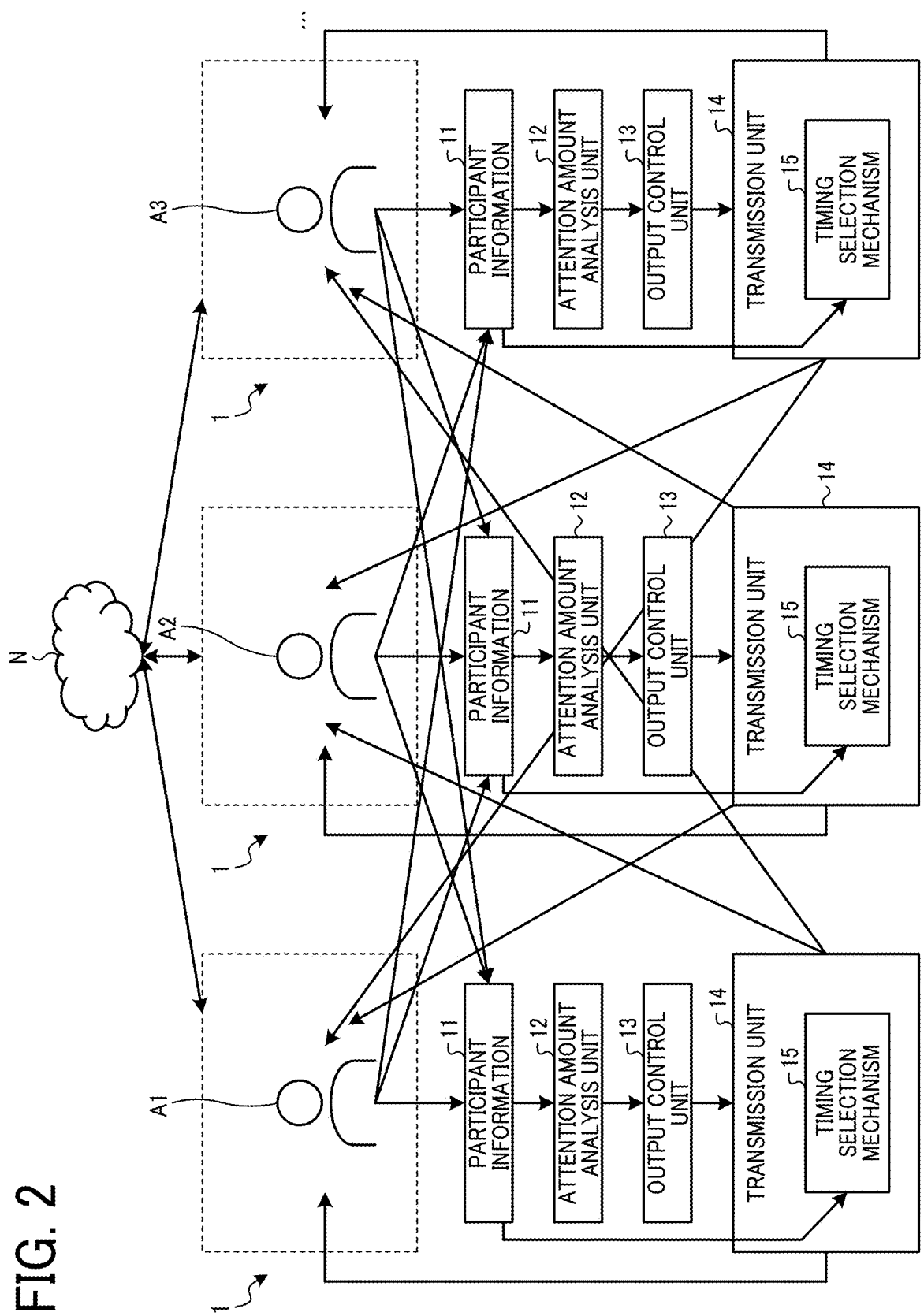
FIG. 2 is a diagram illustrating an example of connection of the information processing apparatus.

FIG. 2 is a diagram illustrating an example of connection of the information processing apparatus 1. The information processing apparatus 1 is connected to a network N, and communicates with each information processing apparatus 1 of a plurality of participants including A1, A2, and A3. The number of information processing apparatuses 1 for the participants including participant A1, participant A2, and participant A3 is 2 or more including an own device.

The network N refers to a facility for enabling transmission and reception of information between the information processing apparatuses 1 of the participants including the participant A1, the participant A2, and the participant A3. The network N for establishing a conversation between the participants including the participant A1, the participant A2, and the participant A3 and the network N for transmitting and receiving output information may or may not be the same.

The functional configuration of each information processing apparatus 1 for the participants including the participant A1, the participant A2, and the participant A3 is the same as the functional configuration illustrated in FIG. 1 and includes the participant information 11, the attention amount analysis unit 12, the output control unit 13, the transmission unit 14 and the timing selection mechanism 15.

In this configuration, the attention amount analysis unit 12 inputs the participant information 11 and outputs the attention amount. When the attention amount analysis unit 12 analyzes the attention amount corresponding to a particular participant A1, in addition to the information of the participant A1, the participation information 11 of the other participants in the conversation including the participant A2 and the participant A3 may also be input. The output control unit 13 outputs a value based on the attention amount obtained by the attention amount analysis unit 12. The transmission unit 14 transmits the output information m1 obtained by the output control unit 13 to the participants through the medium.

The medium that affects the participant's senses, such as sight, hearing, taste, smell, or touch is used. For example, vision is mediated by lighting. LEDs, laser light, displays, or objects themselves. For hearing, speakers, earphones, headphones, or bone conduction earphones are used as the medium. The sense of taste or smell is mediated by electrodes acting on the human tongue, or by vapor or air containing certain molecules. The sense of touch is mediated by a rotor such as a motor, a piezoelectric element, hydraulic pressure, air pressure, water pressure, a spring, a heater such as a heating wire or hot water, a peltier element, or a cooler such as water. Further, the medium may be combined.

Candidates for transmission destinations from the information processing apparatus 1 are all participants in the conversation, and actual transmission targets are, for example, all participants other than the participant himself, specific persons among the other participants, or any of the participants, including the participant himself may be used. Further, the transmission destination may be switched.

The timing selection mechanism 15 includes one or more of a manual timing selection mechanism 15-1 that determines timing by an instruction from the participant and an automatic timing selection mechanism 15-2 that automatically determines the timing. Note that the timing selection mechanism 15 may change the timing for each transmission destination.

Figure 25:
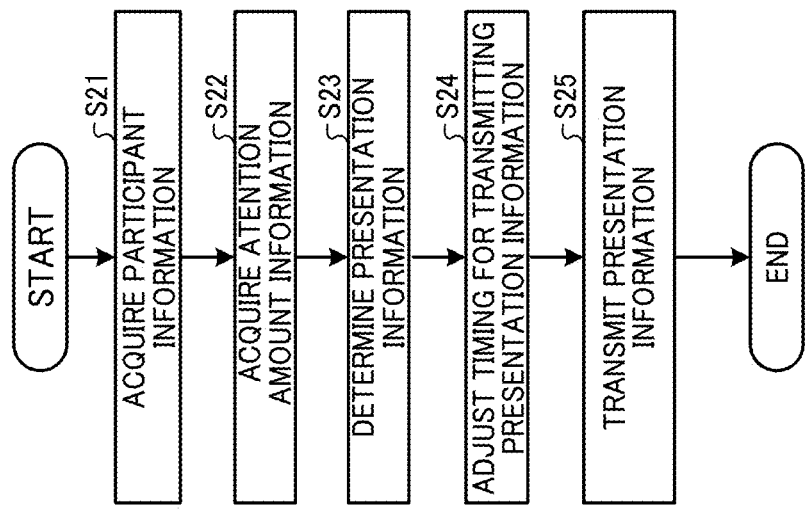
FIG. 25 is a flowchart illustrating a process executed by the information processing apparatus.

With reference to FIG. 25, a process executed by the information processing apparatus 1 is described.

In step S21, the participant attribute and subjective information acquisition unit 16 acquires participant information 11 related to a particular participant during communication among a plurality of participants. The participant information 11 of the participant is, for example, a camera image and biometric information.

In step S22, the attention amount analysis unit 12 acquires the attention amount from the participant information 11 and outputs the acquired attention information.

In step S23, the output control unit 13 determines a value based on the amount of attention acquired in step S22, and outputs the value as the presentation information.

In step S24, the timing selection mechanism 15 adjusts the transmission timing of the presentation information. For example, either the manual timing selection mechanism 15-1 that determines timing by the instruction from the participant, or the automatic timing selection mechanism 15-2 that automatically determines the timing, is selected. Based on the selection, the timing selection mechanism 15 adjusts the timing of transmission of the presentation information.

In step S25, the transmission unit 14 transmits the presentation information obtained in step S23 to the participants through the medium.

The timing determination process is described in more detail in the following.

Figure 3:
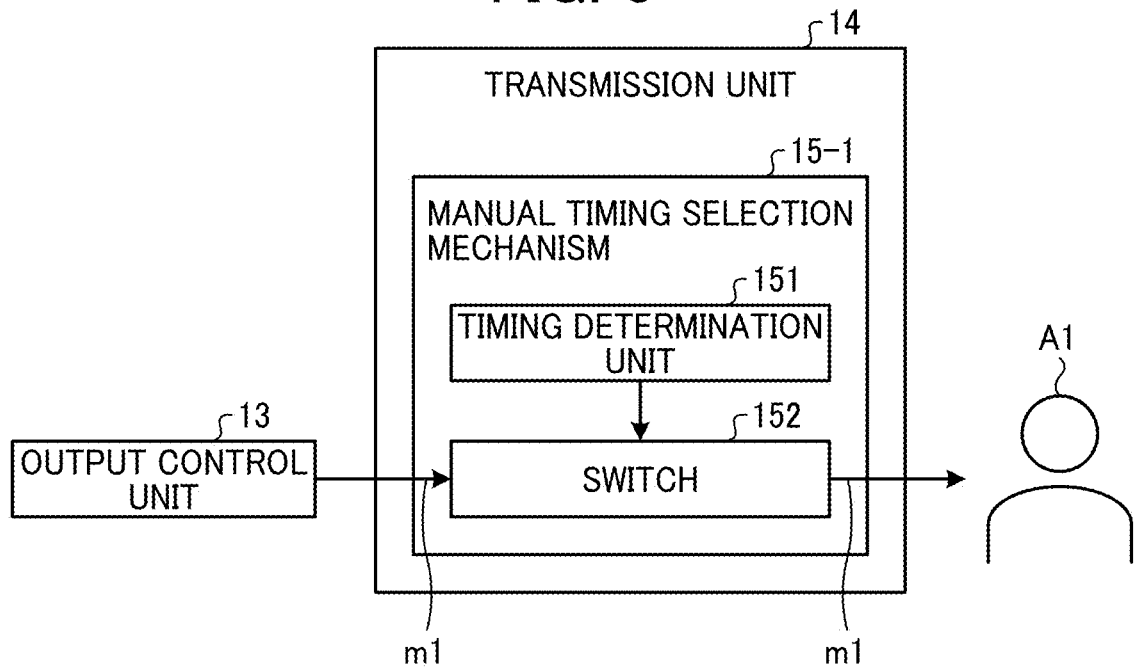
FIG. 3 is a block diagram illustrating a manual timing selection mechanism.

FIG. 3 is a block diagram illustrating the manual timing selection mechanism 15-1. As illustrated in FIG. 3, the manual timing selection mechanism 15-1 includes a timing determination unit 151 and a switch 152.

The switch 152 switches whether to transmit the output information output from the output control unit 13 to the participant A1. A switching by the switch 152 is performed based on the output from the timing determination unit 151. The manual timing selection mechanism 15-1 is implemented by a combination of software and hardware.

Figure 4:
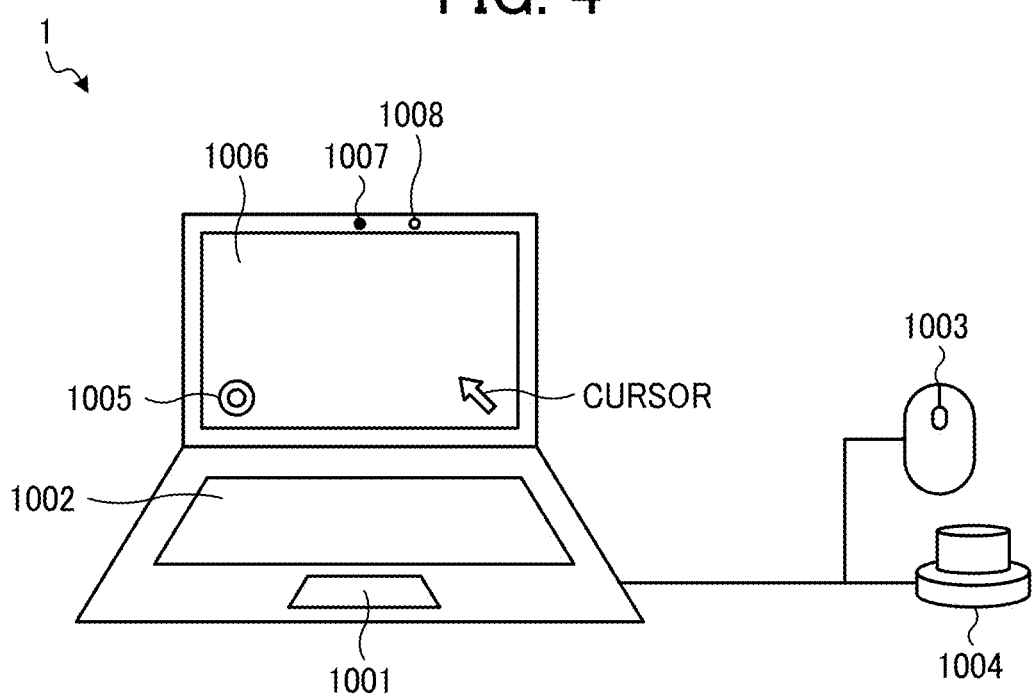
FIG. 4 is a diagram illustrating an embodiment of a timing determination unit of the manual timing selection mechanism.

FIG. 4 is a diagram illustrating an example of a timing determination unit 151 of the manual timing selection mechanism 15-1. As illustrated in FIG. 4, a computer implementing each information processing apparatus 1 of each participant A1, participant A2, and participant A3, are provided with interfaces such as a track pad 1001, keyboard 1002, mouse 1003, buttons 1004, and software buttons 1005. A display 1006 is provided with a touch panel. The timing determination unit 151 determines the timing by combining a signal generated by the participant A1 operating a hardware interface and software that detects the signal and operates on the computer.

In addition, the timing determination unit 151 uses input units such as the camera 1007 and the microphone 1008 to obtain signals from video and audio derived from the participants or objects other than the participants, and determine the timing based on the detected signal combined with software running on the computer. The software determines the timing according to, for example, participant A1's gestures, specific movements, patterns, or voices uttered by participant A1.

Various interfaces, such as the camera 1007, the microphone 1008, and the like may not be provided with the computer, and may be connected to the computer as external devices when used.

The switch 152 may be a combination of one or both of a switch that operates as software and a switch that operates as hardware that physically blocks electrical signals or optical information.

Accordingly, by providing the manual timing selection mechanism 15-1, the participant A2 can switch at any timing whether to transmit the output information m1 output from the output control unit 13 to the participant A1. By entrusting the timing of switching to each participant, the output information m1 can be sent when a participant wants to send to other participants what the participant is paying attention to. The output information m1 may be transmitted, for example, to have a conversation related to a subject of attention, or to inform behavior of other participants that is drawing attention.

As a result, the participant to whom the output information m1 has been sent is able to make appropriate judgment on how other participants are looking at the communication based on a movement and part of the participant. For this reason, during communication with the other party, by emphasizing the movement according to the other participant or increasing the frequency of such movements, performing synchronous behavior that matches the movement of the other participants becomes easier. As a result, information exchange with the other party becomes smoother, and the quality of communication improves.

In addition, since the manual timing selection mechanism 15-1 can clearly communicate one's intention as information, the manual timing selection mechanism 15-1 is also suitable for building trusting relationships and for educational purposes.

Figure 5:
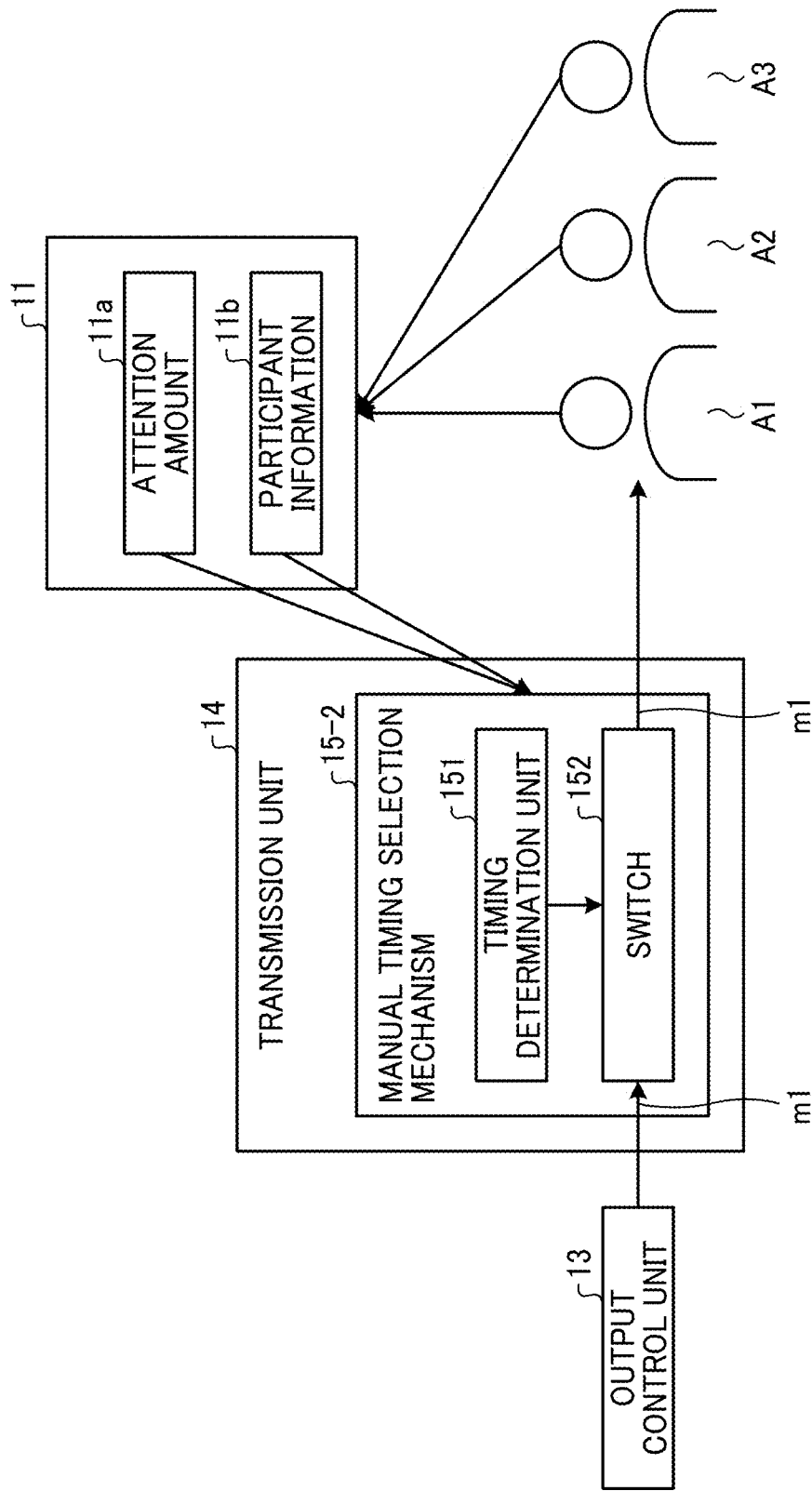
FIG. 5 is a block diagram illustrating a timing determination process of an automatic timing selection mechanism.

The effects of the manual timing selection mechanism 15-1 are also obtained in the automatic timing selection mechanism 15-2. FIG. 5 is a block diagram illustrating a timing determination process of an automatic timing selection mechanism 15-2. As illustrated in FIG. 5, the transmission unit 14 includes an automatic timing selection mechanism 15-2. The automatic timing selection mechanism 15-2 also includes the timing determination unit 151 and a switch 152. In the automatic timing selection mechanism 15-2, the timing determination unit 151 determines the timing based on one or more of either the participant information 11b or the attention amount 11a of the participant information 11.

FIGS. 6A to 6D are diagrams illustrating an example of a timing determination method performed by the automatic timing selection mechanism 15-2. The automatic timing selection mechanism 15-2 determines the timing according to the attention amount of the participant and outputs the timing to the switch 152, thereby turning the switch 152 on for the period specified by the timing. The switch 152 is off, except for the period specified as described above.

FIGS. 6A to 6D illustrate graphs of changes in the attention amount of the participants with time on the horizontal axis and the relationship with the operation of the switch 152. FIGS. 6A to 6D illustrate four patterns of the timing determination method as examples.

Figure 6A:
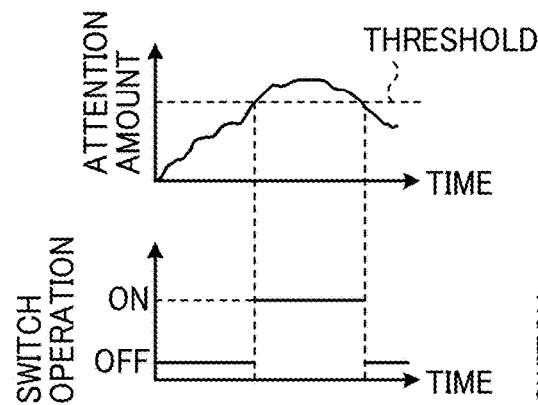
FIGS. 6A to 6D are diagrams illustrating an example of a timing determination method performed by the automatic timing selection mechanism.
Figure 6B:
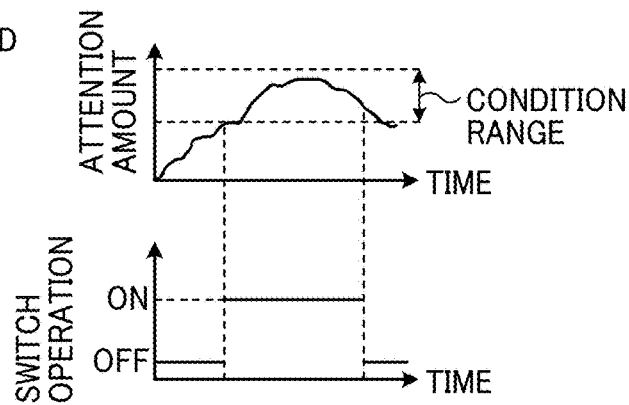
Figure 6C:
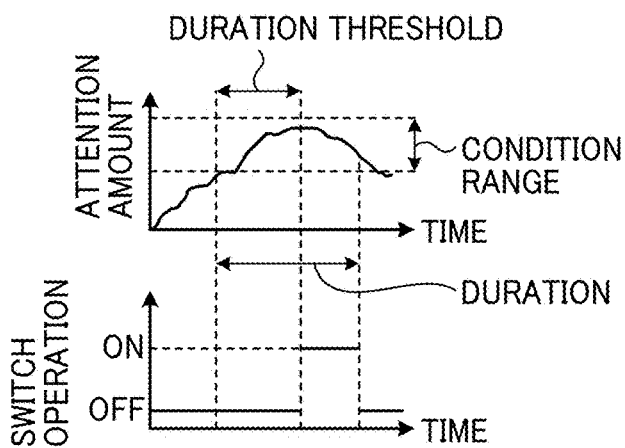
Figure 6D:
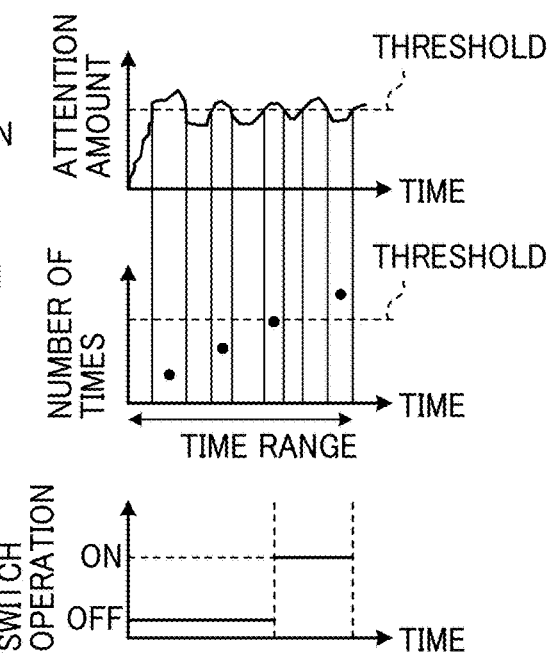

In a first pattern of the method illustrated in FIG. 6A, the switch 152 is turned on in the time period when the attention amount of the participant exceeds a certain threshold, and the output information is transmitted to the participant. In a second pattern of the method illustrated in FIG. 6B, the switch 152 is turned on during the time period when the attention amount of the participant is within a certain range of condition. In a third pattern of the method illustrated in FIG. 6C, when the participant's attention falls within a certain condition range and the duration exceeds a certain threshold, the switch 152 is turned on after exceeding the duration threshold. FIG. 6D further includes a graph illustrating the total number of times with time on the horizontal axis. In a fourth pattern of the method illustrated in FIG. 6D, the number of times the attention amount of the participants exceeds a certain threshold is counted. When the number of times exceeds the threshold within a certain time range, the switch 152 is turned on after the number of times threshold is exceeded. When counting the number of times, a duration of time when the attention amount exceeds the threshold may be added as a condition for counting the number of times.

In the case of the automatic timing selection mechanism 15-2, an object of interest and the attention amount of the participant are automatically collected using a sensor or the like. Accordingly, transmitting the output information to a target person without overlooking an object of attention and the attention amount that the participant is unaware of becomes possible. In addition to the method of turning on the switch 152, machine learning or the like may be used to determine an optimum timing in a more complicated situation.

The manual timing selection mechanism 15-1 transmits information based on an intention of the participant, and an operation is to be made to determine the timing. On the other hand, since the automatic timing selection mechanism 15-2 is not initiated by the operation of the participant, in a conversation with a relatively long duration such as a presentation or a lecture, the attention amount can be shared without the operation of the participant, and the quality of communication can be efficiently improved.

Figure 7B:
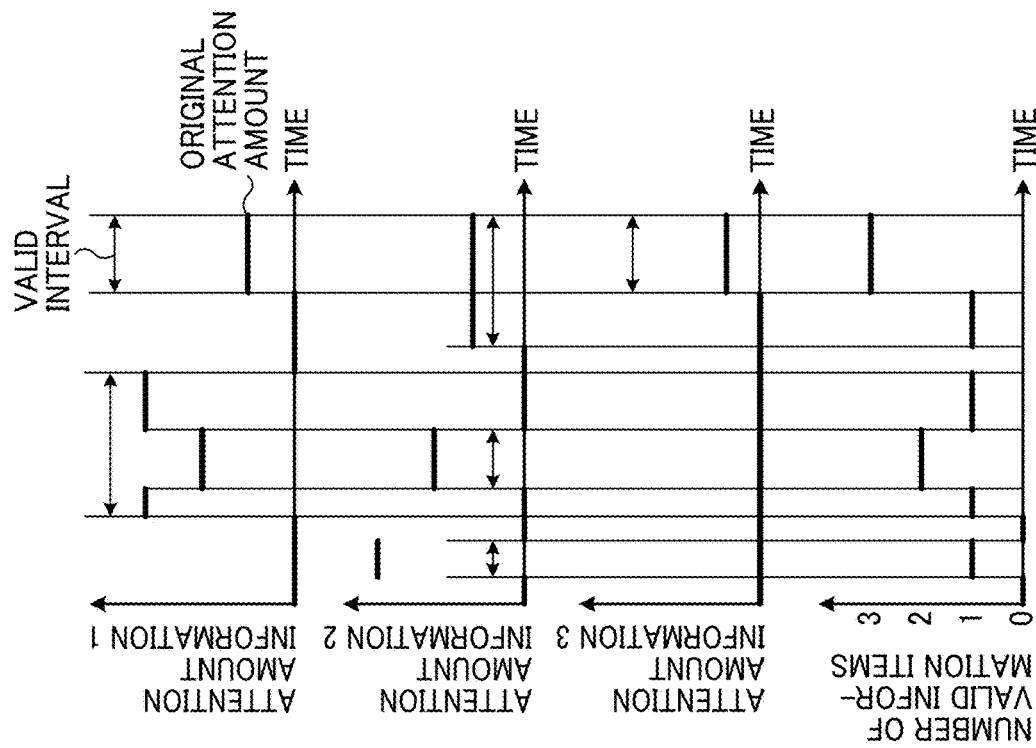
FIGS. 7A and 7B are diagrams illustrating an example of an attention amount analysis method.
Figure 7A:
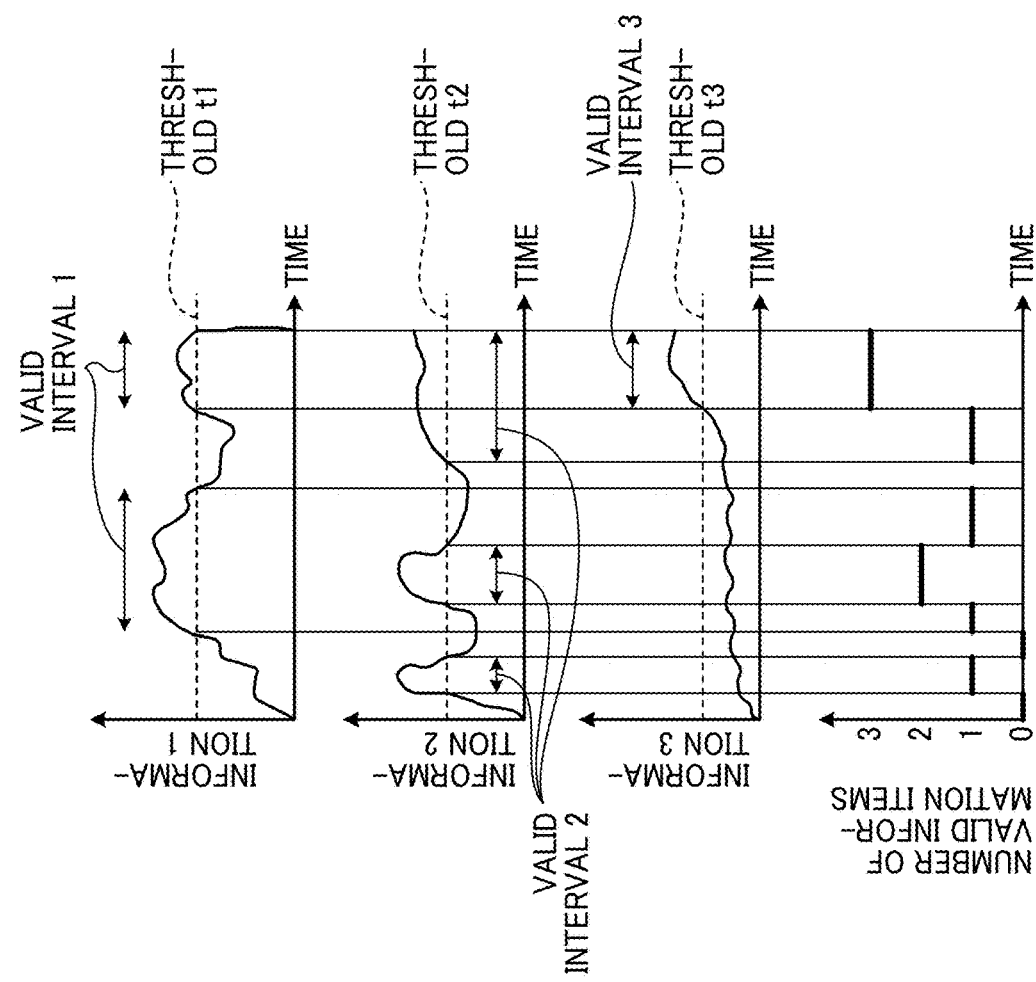

FIGS. 7A and 7B are diagrams illustrating an embodiment of the attention amount analysis unit 12. FIG. 7A illustrates a graph indicating changes in the attention amount of each of the information 1 to information 3 of the participants, and a graph illustrating a number of valid information items among the information 1 to 3, with time on the horizontal axis.

The information 1, information 2, and information 3 are different items of information, such as line-of-sight information, video information, and audio information.

The number of valid information items is the number of information items that satisfies a certain condition corresponding to each information at a certain time instant. In other words, the number of valid information items is the total number of items of information exceeding the threshold of various types of information.

A temporal interval that satisfies a certain condition (in this example, is equal to or greater than a threshold value) is defined as a valid interval. Since the information 1, information 2, and information 3 are different information items, different thresholds such as a threshold t1, threshold t2, and threshold t3 are set. The settings of the threshold t1, the threshold t2, and the threshold t3 may be appropriately determined according to the information item. For example, two or more of threshold t1, threshold t2, and threshold t3 may be the same.

Since the information 1, information 2, and information 3 are the information items that the participants pay attention to, the information items have different attention amount according to time. Therefore, the information 1, information 2, and information 3 have different temporal positions and durations indicating valid intervals. In the valid intervals of information 1, information 2, and information 3, the number of valid information items with respect to time is obtained. For example, when two items of information satisfy the corresponding conditions at a given moment, two valid intervals overlap at that moment, and two pieces of valid information items are counted.

Next, as illustrated in FIG. 7(b), by applying the number of valid information items at each time, an exact attention amount is calculated by each attention amount for the time change of information 1 attention amount to information 3 attention amount, each calculated from multiple information.

Let Att_1(t) be the attention amount of information 1 at a certain moment before the number of valid information is applied, and N_sub(t) be the number of valid information at that moment. Substantial information 1 attention amount Att_1_sub(t) is, for example, the following formula (1).

$$Att\_1\_sub(t) = Att\_1(t)/N\_sub(t) \quad (1)$$

This formula (1) is based on a theory that the attention amount that a person can devote is finite, that is, a finite amount of so-called attentional resources. For example, comparing a case where a participant continuously gazes at a point while speaking, and a case where the participant continuously gazes at the point without speaking, even when time of gazing is similar, the amount of attention based on visual information is greater in the latter case. This is because the former allocates a finite amount of gaze resources to both the speech content and gaze, so the amount allocated to the actual gaze resources is small.

Also, the substantial attention amount may not be simply inversely proportional as in the above formula. In that case, for example, valid n items of information are weighted, and the following formula (2) is used.

$$Att\_1\_sub(t) = Att\_1(t)*w\_1 + Att2(t)*w\_2 + Att\_3(t)*w\_3 \quad (2)$$

$0 \le w\_1, w\_2, w\_3 \le 1$

Let $w\_1 + w\_2 + w\_3 = 1$.

These weighting coefficients w_1, w_2, and w_3 may correspond to the information of the participants and the state of the conversation. For example, subjective information that the participant prefers to concentrate on visual information is obtained in advance, and the value of the corresponding weighting factor is increased according to the information. In a situation where voice information such as speech is more significant than lectures, for example, in interviews, the weighting coefficient corresponding to voice information is increased.

Figure 8B:
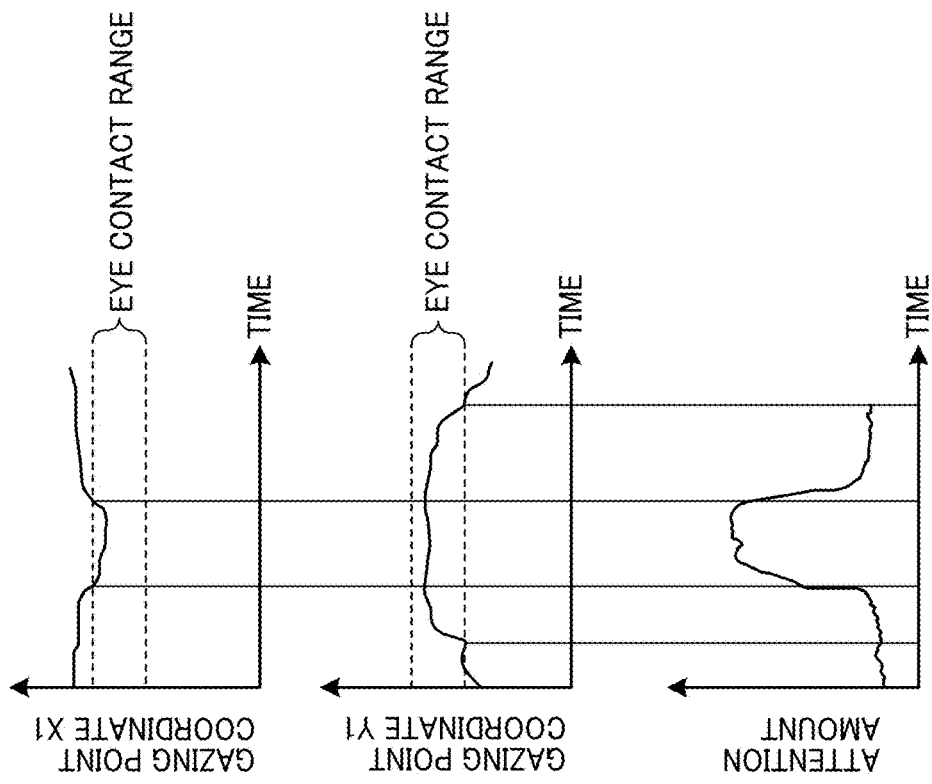
FIGS. 8A and 8B are diagrams illustrating the attention amount analysis method based on participant's gaze information.
Figure 8A:
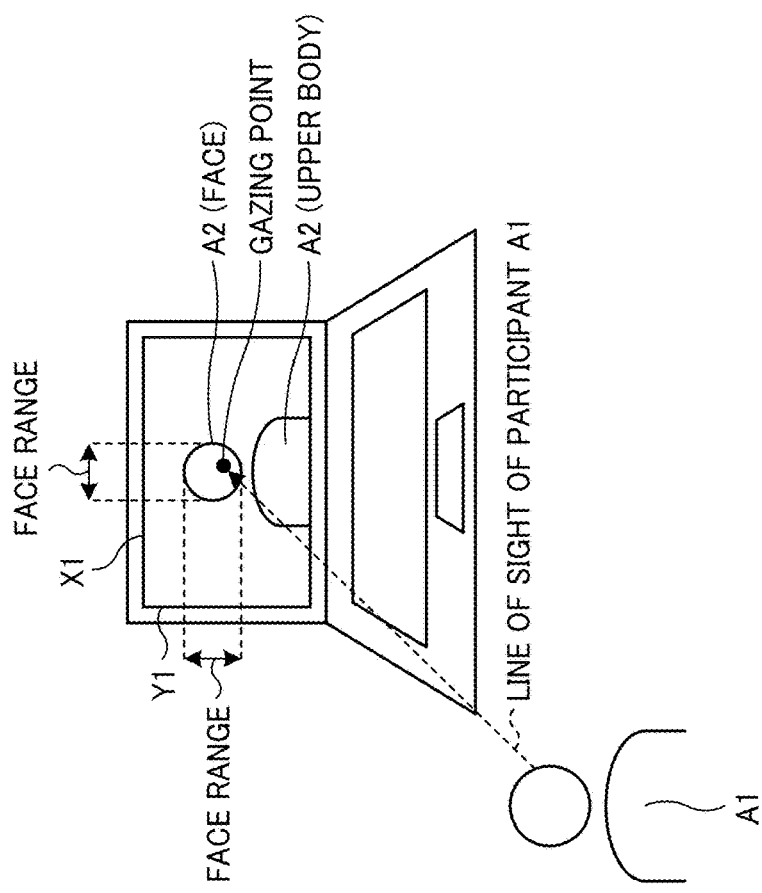

FIGS. 8A and 8B are diagrams illustrating the attention amount analysis method based on gaze information of the participant A1. As illustrated in FIG. 8A, the information processing apparatus 1 of participant A1 displays video information of another participant A2 participating in the conversation. The participant A1 converses while viewing video information of participant A2.

In FIG. 8A, the attention amount analysis unit 12 detects a line of sight of the participant A1 to detect coordinate of a gazing point. The attention amount analysis unit 12 also detects a range of a face of the participant A2 and feature points of the face. The attention amount analysis unit 12 calculates the range of the face and the feature points of the face, for example, an eye contact range, and compares the gazing point coordinates and the eye contact range along a coordinate axis X1 and a coordinate axis Y1. The eye contact range is, for example, a certain range from center of participant A2's nose.

As illustrated in FIG. 8B, the attention amount analysis unit 12 performs a process of increasing the attention amount due to the attention w % ben the participant A1 is gazing at an area corresponding to the eye contact range.

Figure 9:
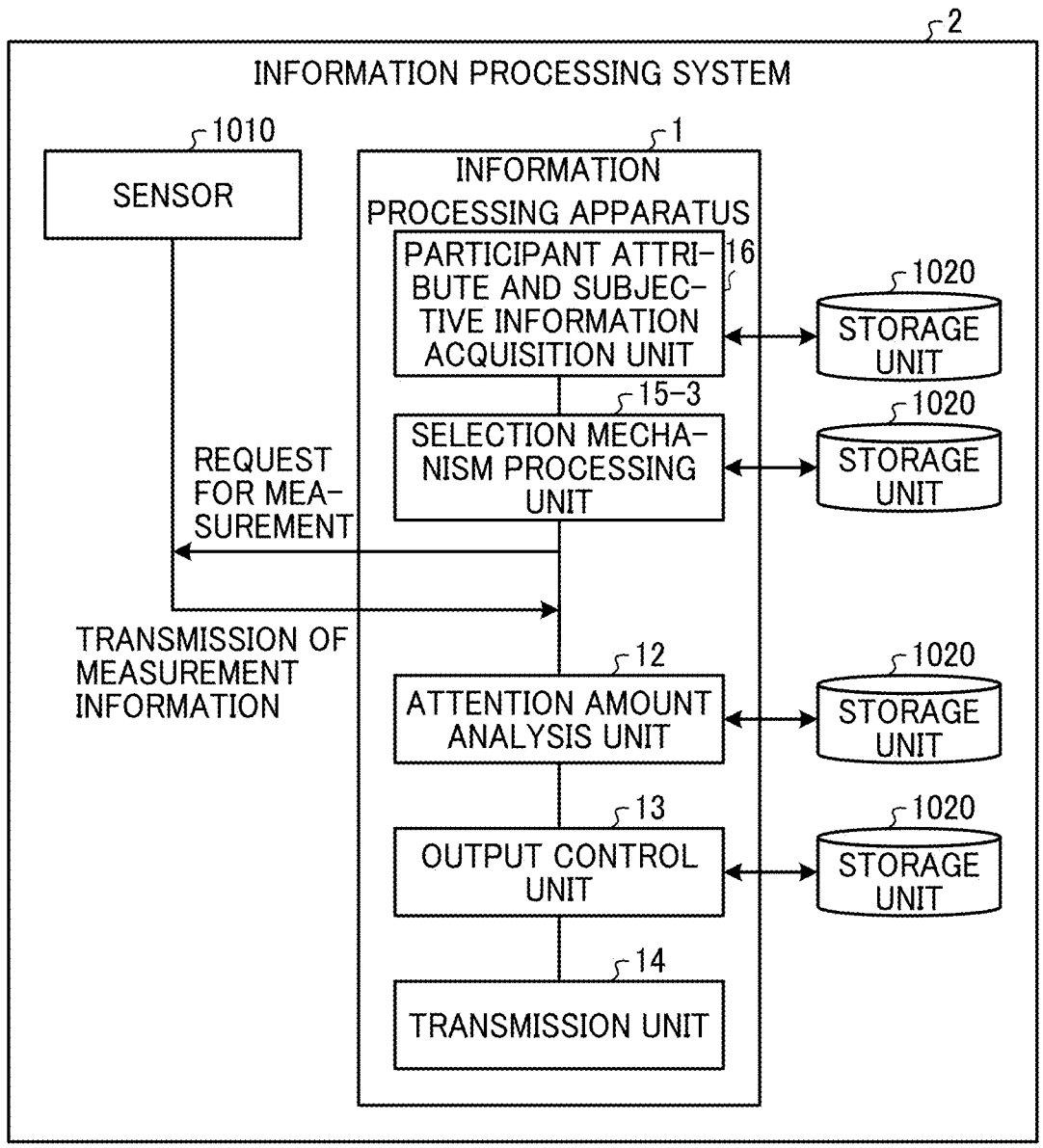
FIG. 9 is a block diagram illustrating an example of a functional configuration of an information processing system.

FIG. 9 is a block diagram illustrating an example of a functional configuration of an information processing system. As illustrated in FIG. 9, the information processing system 2 includes a sensor 1010 and the information processing apparatus 1.

The information processing apparatus 1 is implemented by the computer and includes a participant attribute and subjective information acquisition unit 16, a selection mechanism processing unit 15-3, an attention amount analysis unit 12, an output control unit 13 and a transmission unit 14, which are functional units implemented by executing a program and operate as described in the following.

First, the participant attribute and subjective information acquisition unit 16 reads the attribute information or subjective information of the participant from the storage unit 1020. Next, the selection mechanism processing unit 15-3 determines the timing selection mechanism 15 to be used by the transmission unit 14 to transmit the output information based on the participant's attribute information or subjective information. The timing selection mechanism 15 determined by the selection mechanism processing unit 15-3 is, for example, the manual timing selection mechanism 15-1 illustrated in FIG. 3 and the automatic timing selection mechanism 15-2 illustrated in FIG. 5. The selection mechanism processing unit 15-3 transmits information indicating the determination related to the timing selection mechanism 15 to the transmission unit 14. The operation of the selection mechanism processing unit 15-3 is described below with reference to FIG. 10. The selection mechanism processing unit 15-3 then requests the sensor 1010 for measurement. The sensor 1010 measures the information of the participants and transmits the measured information to the information processing apparatus 1.

Next, the attention amount analysis unit 12 makes a measurement request to the sensor 1010. The sensor 1010 measures the information of the participants and transmits measurement information to the attention amount analysis unit 12. The attention amount analysis unit 12 analyzes the attention amount based on the measurement information and the participant attributes and subjective information read in advance. The attention amount is stored in the storage unit 1020.

Next, the output control unit 13 reads the attention amount from the storage unit 1020, calculates the output information based on the attention amount, and stores the output information in the storage unit 1020.

Then, the transmission unit 14 reads the output information and performs transmission processing for transmitting the output information to the participants. The transmission unit 14 uses the timing selection mechanism 15 (for example, the manual timing selection mechanism 15-1, and the automatic timing selection mechanism 15-2) determined by the selection mechanism processing unit 15-3 to adjust the timing of transmitting the output information to the participants. In a case calculation time for attention analysis is insufficient, by performing the operation after processing in the computer, the output information can be transmitted to the participants with as little delay as possible with respect to the time instants selected by the timing selection mechanism 15 within a transmission process.

Figure 10:
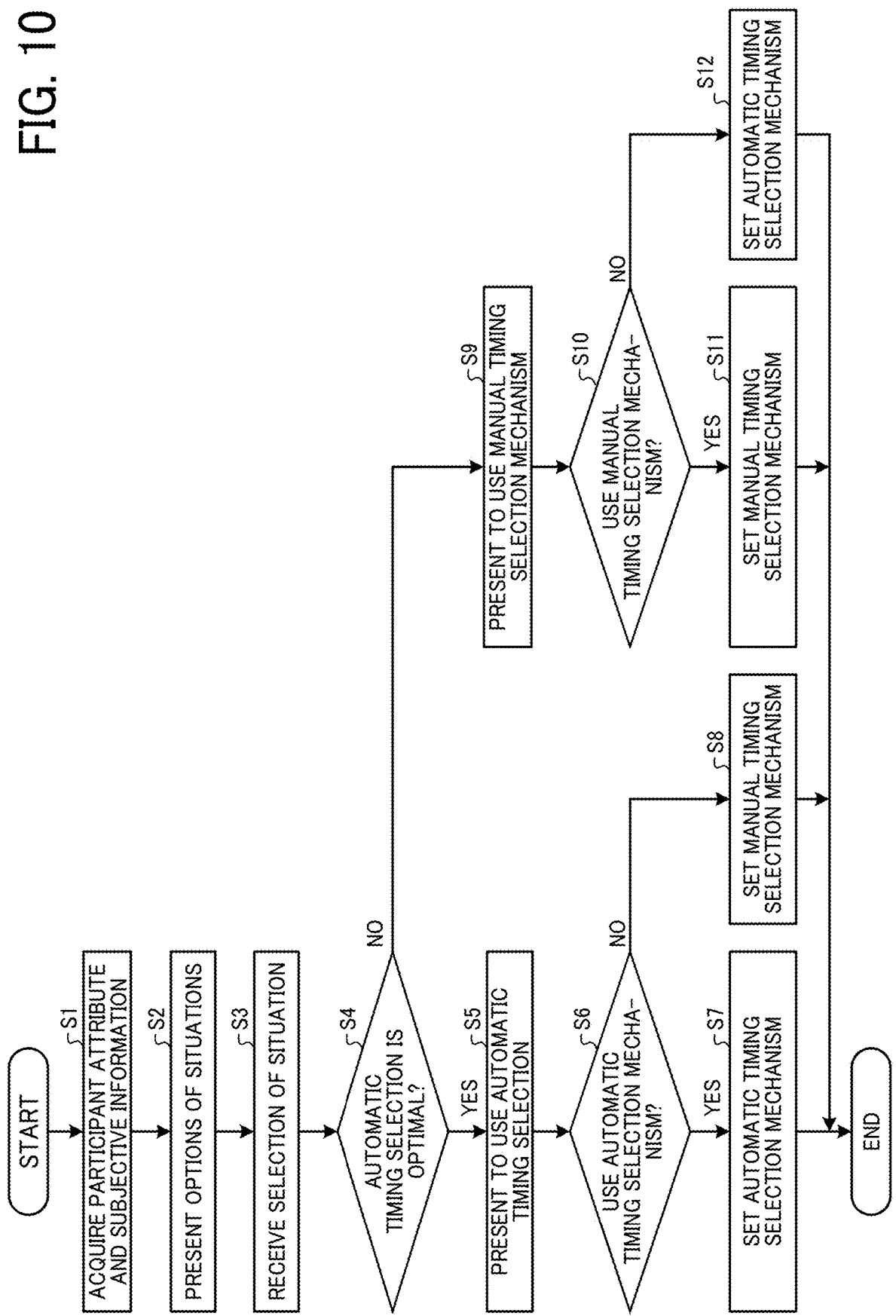
FIG. 10 is a flowchart illustrating an example of a process executed by a timing selection mechanism.

FIG. 10 is a flowchart illustrating an example of a process for determining the timing selection mechanism 15 of the transmission unit 14 by the selection mechanism processing unit 15-3. Here, a description is made of a process executed by the selection mechanism processing unit 15-3 selecting one of the automatic timing selection mechanism 15-2 and the manual timing selection mechanism 15-1 included in the transmission unit 14.

In step S1, the selection mechanism processing unit 15-3 acquires the attribute information and subjective information of the participant acquired by the participant attribute and subjective information acquisition unit 16.

In step S2, the selection mechanism processing unit 15-3 presents a plurality of options. This presentation is performed to connect the participants with what kind of situation the conversation in which the participants participate corresponds to. The situation to be presented may be prepared in advance or may be assumed from the attribute information and subjective information of the participant. In addition, an option when the participant is not able to find an applicable situation, such as "there is no relevant situation" may be provided.

In step S3, the participant selects the situation that is considered to be equivalent to or close to the conversation and the selection is received by the selection mechanism processing unit 15-3.

In step S4, the selection mechanism processing unit 15-3 determines whether the use of the automatic timing selection mechanism 15-2 is optimal in the selected situation.

In step S5, based on the determination by the selection mechanism processing unit 15-3 that the use of the automatic timing selection mechanism 15-2 is optimal (YES in step S4), the selection mechanism processing unit 15-3 presents a recommendation to the participant to use the automatic timing selection mechanism 15-2.

In step S6, since the participant is to select whether to use the automatic timing selection mechanism 15-2 or the manual timing selection mechanism 15-1 according to the options, the selection mechanism processing unit 15-3 determines whether the automatic timing selection mechanism 15-2 is selected.

In step S7, based on a determination that the use of the automatic timing selection mechanism 15-2 is selected (Yes in step S6), the selection mechanism processing unit 15-3 sets the timing selection mechanism 15 to the automatic timing selection mechanism 15-2.

In step S8, based on a determination that the use of the automatic timing selection mechanism 15-2 is not selected (NO in step S6), the selection mechanism processing unit 15-3 sets the timing selection mechanism 15 to the manual timing selection mechanism 15-1.

In step S9, based on a determination by the selection mechanism processing unit 15-3 that the use of the automatic timing selection mechanism 15-2 is not optimal (NO in step S4), the selection mechanism processing unit 15-3 presents a recommendation to use the manual timing selection mechanism 15-1.

In step S10, since the participant is to select the use of the automatic timing selection mechanism 15-2 or the manual timing selection mechanism 15-1 according to the options, the selection mechanism processing unit 15-3 determines whether use of the manual timing selection mechanism 15-1 is selected.

In step S11, based on the determination that the use of the manual timing selection mechanism 15-1 is selected (YES in step S10), the selection mechanism processing unit 15-3 sets the timing selection mechanism 15 to the manual timing selection mechanism 15-1.

In step S12, based on a determination that the use of the manual timing selection mechanism 15-1 is not selected (NO in step S10), the selection mechanism processing unit 15-3 sets the timing selection mechanism 15 to the automatic timing selection mechanism 15-2. The selection mechanism processing unit 15-3 notifies the transmission unit 14 of the selected timing selection mechanism 15.

As described above, by using the participant's intention as a selection from options for the selection of the timing selection mechanism 15 in addition to the participant information input in advance, even in a situation where the purpose of the conversation is unknown, or in situations where the purpose of the conversation changes from time to time, the participant can decide which timing selection mechanism 15 is effective.

Figure 11:
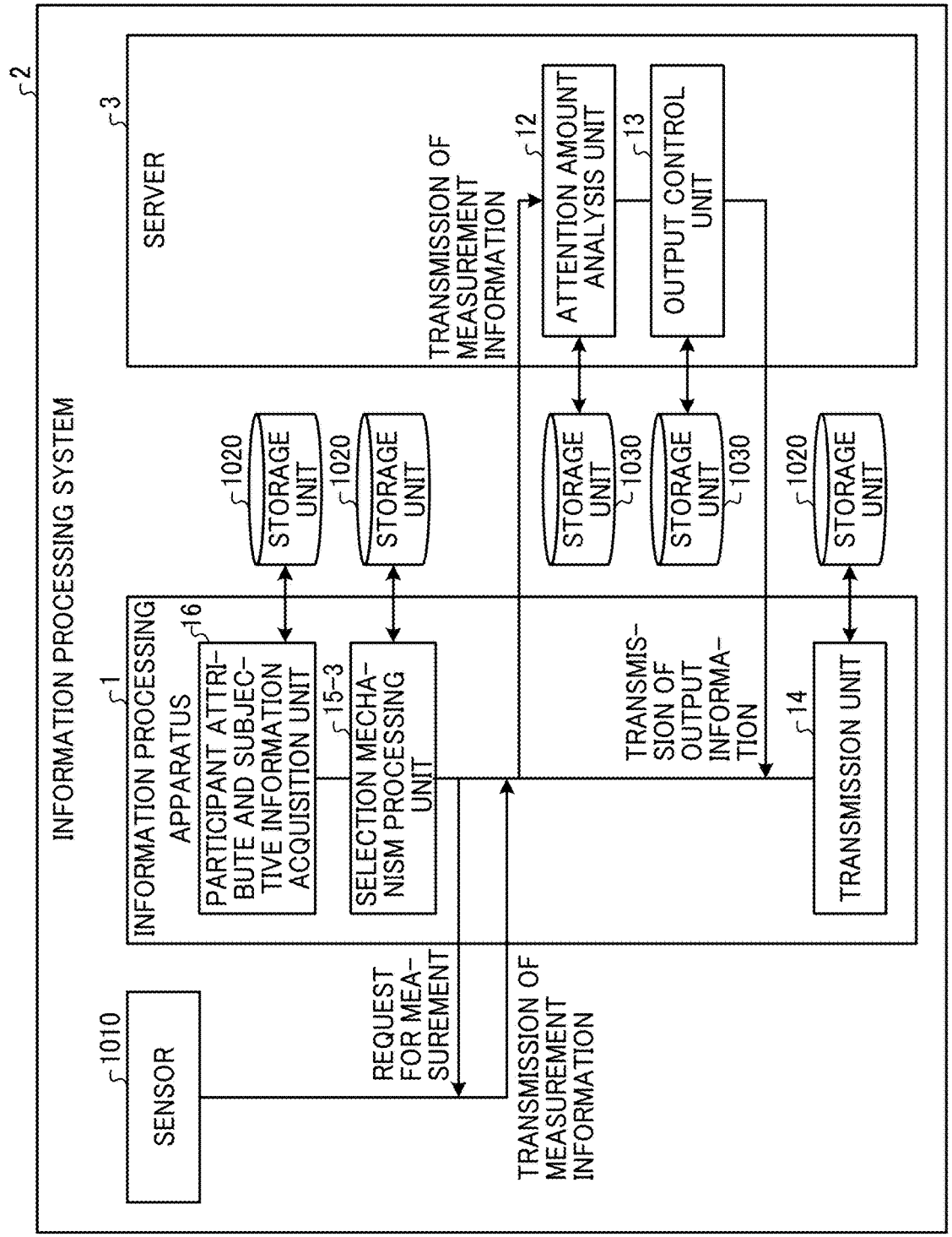
FIG. 11 is a block diagram illustrating another example of the functional configuration of the information processing system.

FIG. 11 is a block diagram illustrating another example of the functional configuration of the information processing system 2. The information processing system 2 includes sensor 1010, an information processing apparatus 1, and a server 3.

The information processing apparatus 1 is implemented by the computer and includes the participant attribute and subjective information acquisition unit 16, the selection mechanism processing unit 15-3, and the transmission unit 14 as functional units by executing programs. The server 3 is implemented by the computer and includes the attention amount analysis unit 12 and the output control unit 13 as functional units by executing programs.

First, in the information processing apparatus 1, the participant attribute and subjective information acquisition unit 16 reads the participant's attribute information or subjective information from the storage unit 1020. Next, the selection mechanism processing unit 15-3 determines the timing selection mechanism 15 used by the transmission unit 14 to transmit the output information based on the flowchart illustrated in FIG. 10. The timing selection mechanism 15 determined by the selection mechanism processing unit 15-3 is, for example, the manual timing selection mechanism 15-1 illustrated in FIG. 3 and the automatic timing selection mechanism 15-2 illustrated in FIG. 5. The selection mechanism processing unit 15-3 transmits information indicating the determination related to the timing selection mechanism 15 to the transmission unit 14.

After that, the information processing apparatus 1 makes a measurement request to the sensor 1010. The sensor 1010 measures the information of the participants and transmits the measurement information to the information processing apparatus 1. The information processing apparatus 1 transmits measurement information to the server 3.

Next, in the server 3, the attention amount analysis unit 12 analyzes the attention amount based on the measurement information transmitted from the information processing apparatus 1 and the participant attributes or subjective information read in advance. The calculated attention amount is stored in the storage unit 1030 of the server 3. The output control unit 13 reads the attention amount from the storage unit 1030 of the server 3, calculates the output information based on the attention amount, and stores the output information in the storage unit 1030 of the server 3.

The output information stored in the storage unit 1030 of the server 3 is transmitted to the information processing apparatus 1, and the transmission unit 14 performs transmission processing for transmitting the output information to the participants. The transmission unit 14 uses the timing selection mechanism 15 (for example, the manual timing selection mechanism 15-1, and the automatic timing selection mechanism 15-2) determined by the selection mechanism processing unit 15-3 to adjust the timing of transmitting the output information to the participants. In a case time for calculating attention amount analysis is insufficient, by performing attention amount analysis and output control processing in the server 3, the output information can be sent to the participants with as little delay as possible with respect to the time instants selected by the timing selection mechanism 15 within the sending process.

Figure 12:
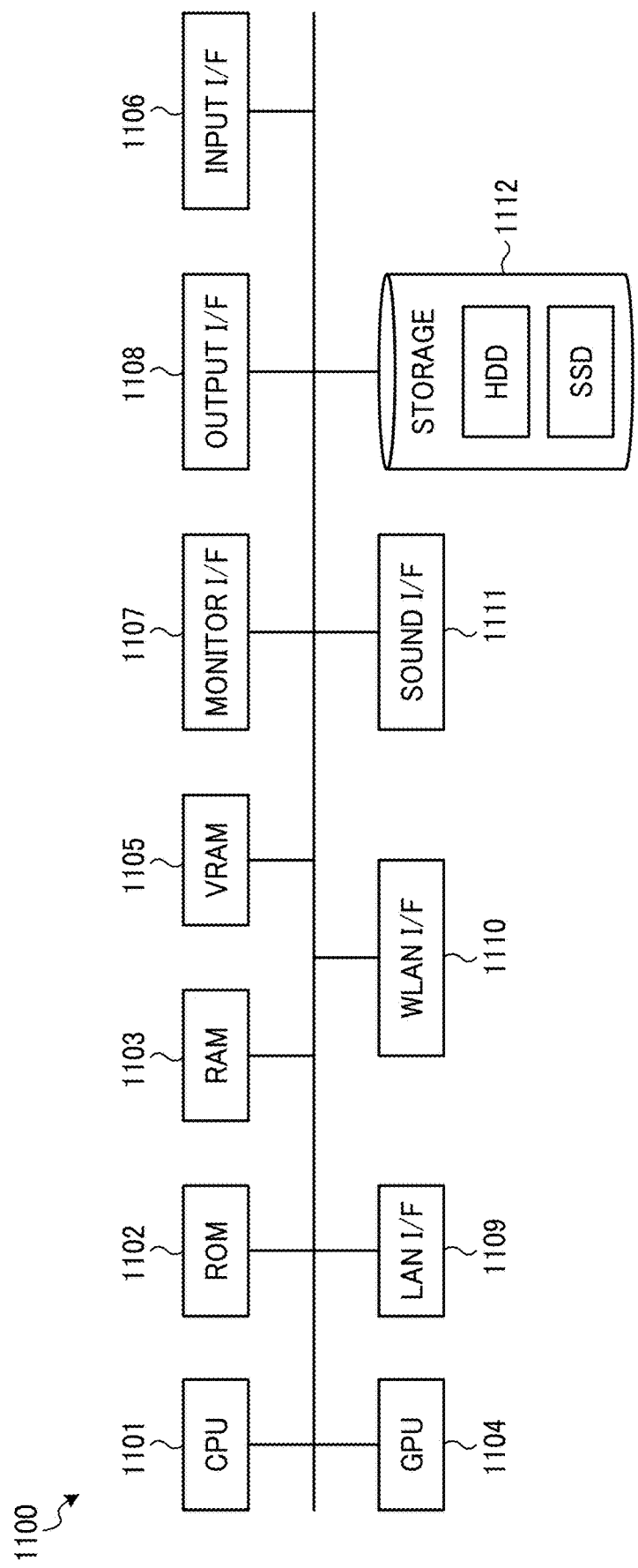
FIG. 12 is a block diagram illustrating an example of a hardware configuration of a computer.

FIG. 12 is a block diagram illustrating an example of a hardware configuration of the computer. The computer 1100 illustrated in FIG. 12 includes a central processing unit (CPU) 1101, a read only memory (ROM) 1102, a random access memory (RAM) 1103, a graphics processing unit (GPU) 1104, a video random access memory (VRAM) 1105, an input interface (I/F) 1106, a monitor IF 1107, an output I/F 1108, a local area network (LAN) I/F 110), a wide area local area network (WLAN) I/F 1110, a sound I/F 1111, a storage 1112, and the like connected to each other through a bus.

The CPU 1101 controls entire operation of the computer 1100. The ROM 1102 stores programs used to drive the CPU 1101. The RAM 1103 is used as a work area for the CPU 1101. The storage 1112 is a hard disk drive (HDD) or a solid state drive (SSD) and stores various data. The GPU 1104 mainly performs graphics processing, and the VRAM 1105 is used for graphics processing by the GPU 1104 and the like.

The input I/F 1106 is an interface for connecting an input device. The input device is, for example, a keyboard, mouse, touch input panel, or camera.

The monitor I/F 1107 is an interface for connecting a monitor. The monitor is the display 1006 such as liquid crystal or organic electro luminescence (EL).

The output I/F 1108 is an interface for connecting a motor, heater, or light source.

The LAN I/F 1109 is an interface for connecting to a LAN. The WLAN 1/F 1110 is an interface for connecting to a wide area LAN.

The sound I/F 1111 is an interface to which a microphone and a speaker are connected and which inputs and outputs sound signals.

Figure 13:
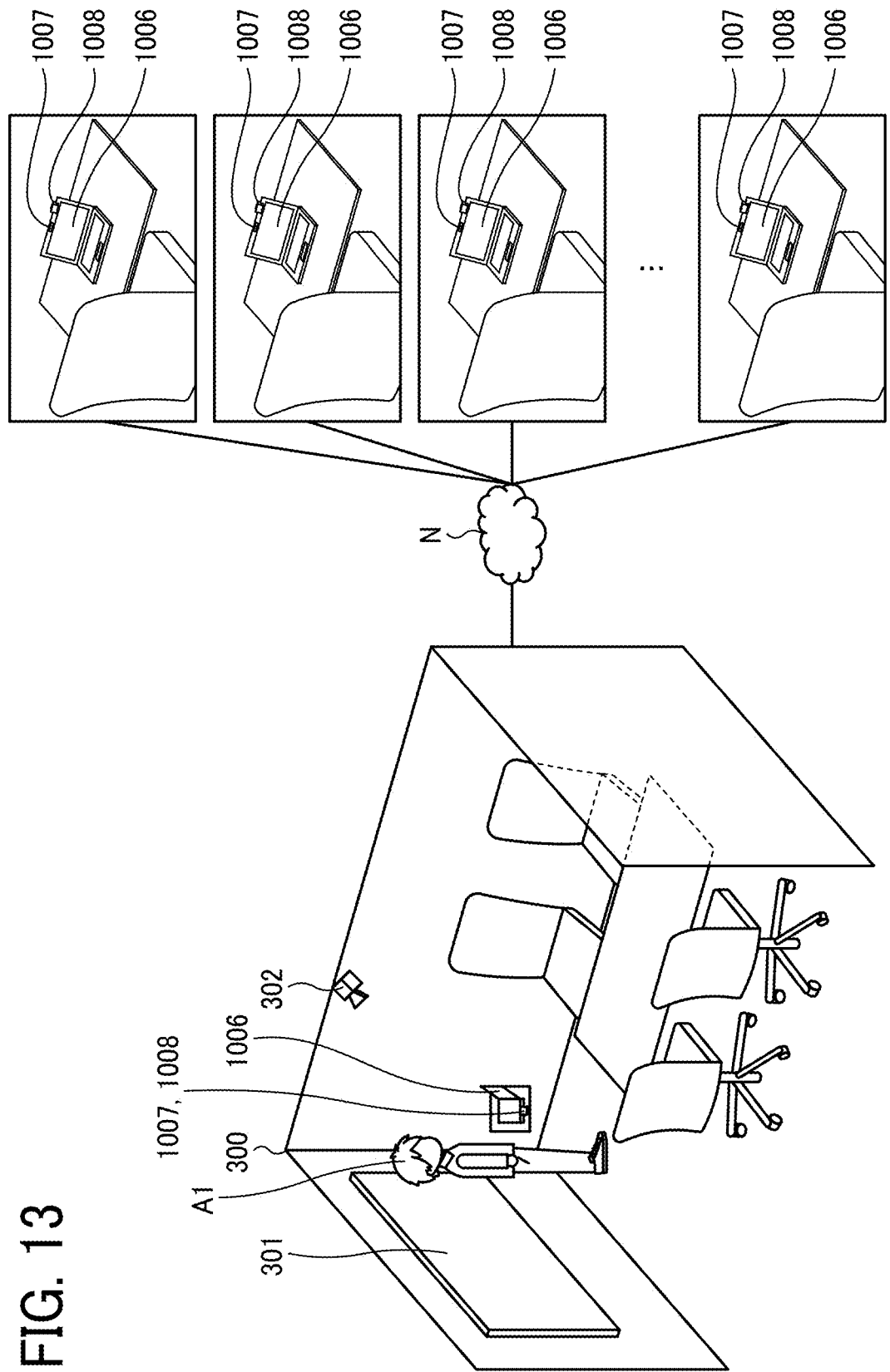
FIG. 13 is a diagram illustrating a first example of a usage scene.

FIG. 13 is a diagram illustrating a first example of a usage scene. As illustrated in FIG. 13, a venue 300 is provided with an information processing apparatus 1, an interactive whiteboard (IWB: a whiteboard having an electronic whiteboard function capable of mutual communication) 301, and a camera 302. The information processing apparatus 1 at the venue 300 is connected to the network N.

A presenter (participant) A1 makes a presentation by displaying the content of the presentation on the IWB 301 while displaying the expressions of the participants on the information processing apparatus 1 of the presenter A1. A video of the presentation of the presenter A1 is captured by the camera 302 in real time. Note that "capture" is used synonymously with "imaging" because the camera takes an image. The captured image and the display information of IWB 301 are transmitted to the information processing apparatus 1 of presenter A1.

The information processing apparatus 1 of the presenter A1 inputs information on a line of sight and voice of the presenter A1 through the input device such as the camera 1007 and the microphone 1008 and transmits such information to the information processing apparatus 1 of the participant A2 connected to the network N together with the captured image and display information.

The information processing apparatus 1 of participant A2 includes sensing devices such as camera 1007 and microphone 1008, and display 1006. The display 1006 displays the captured image of the venue, the display information of the presentation, and the like. The information processing apparatus 1 of the participant A2 captures the participant A2 with the camera 1007, measures the movement of the participant A2 with the sensing devices, and transmits the information to the information processing apparatus 1 of the presenter A1 through the network N.

Figure 14:
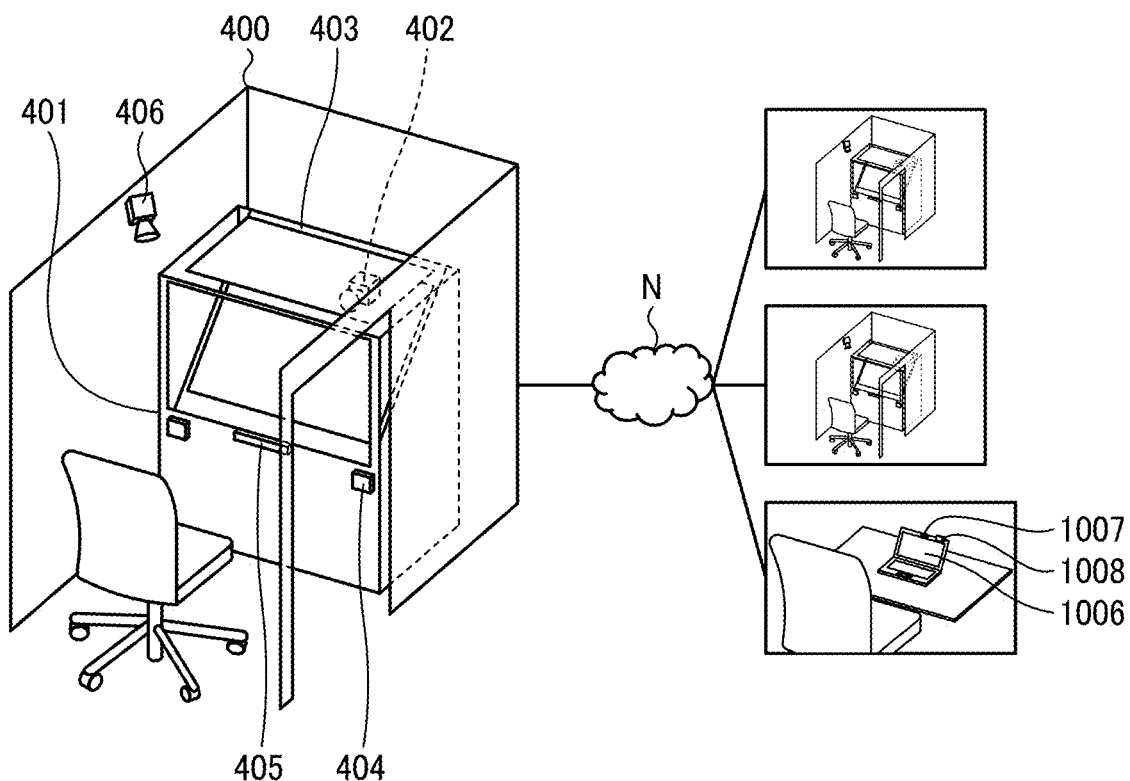
FIG. 14 is a diagram illustrating a second example of the usage scene.

FIG. 14 is a diagram illustrating a second example of the usage scene. FIG. 14 illustrates an example in which the system is used for personal interviews, sales, or the like.

As illustrated in FIG. 14, a booth 400 used for an interview or the like is provided with a housing 401 provided with a computer. The housing 401 is provided with a camera 402, a half mirror 403, a speaker 404 and a sensing device 405. The camera 402 is a camera for capturing an upper body of a subject person. In addition, a camera 406 that captures the subject's entire body is provided.

The computer in each booth 400 is connected to the network N and communicates with, for example, a computer of an interviewee. A notebook personal computer (PC) may be connected to the network N for communication.

Figure 15:
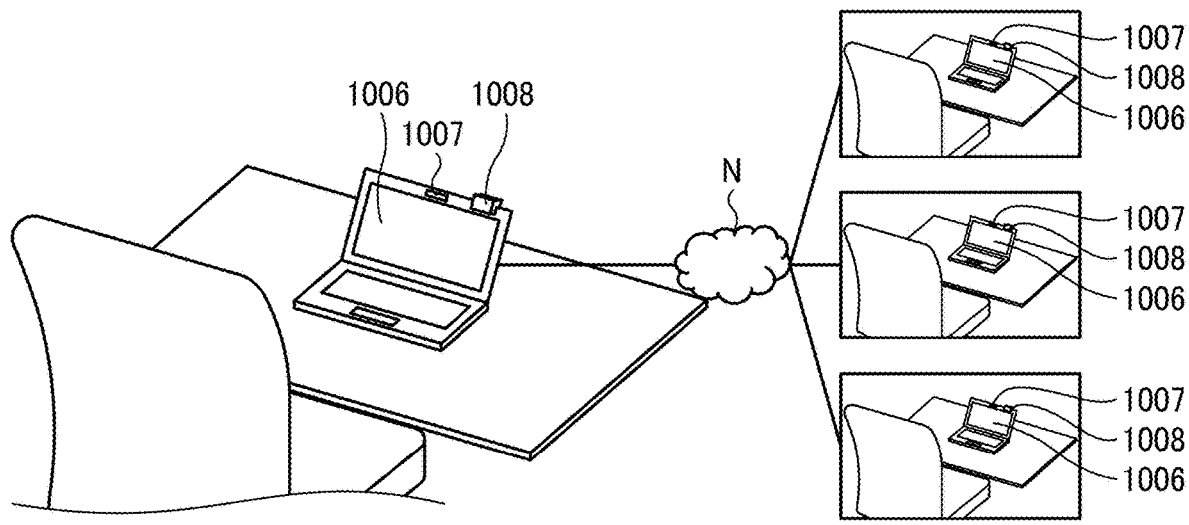
FIG. 15 is a diagram illustrating a third example of the usage scene.

FIG. 15 is a diagram illustrating a third example of the usage scene. FIG. 15 illustrates an example in which the system is used for a meeting. As illustrated in FIG. 15, each participant of the meeting connects to the network N using the notebook PC or the like at each participant's desk.

Figure 16:
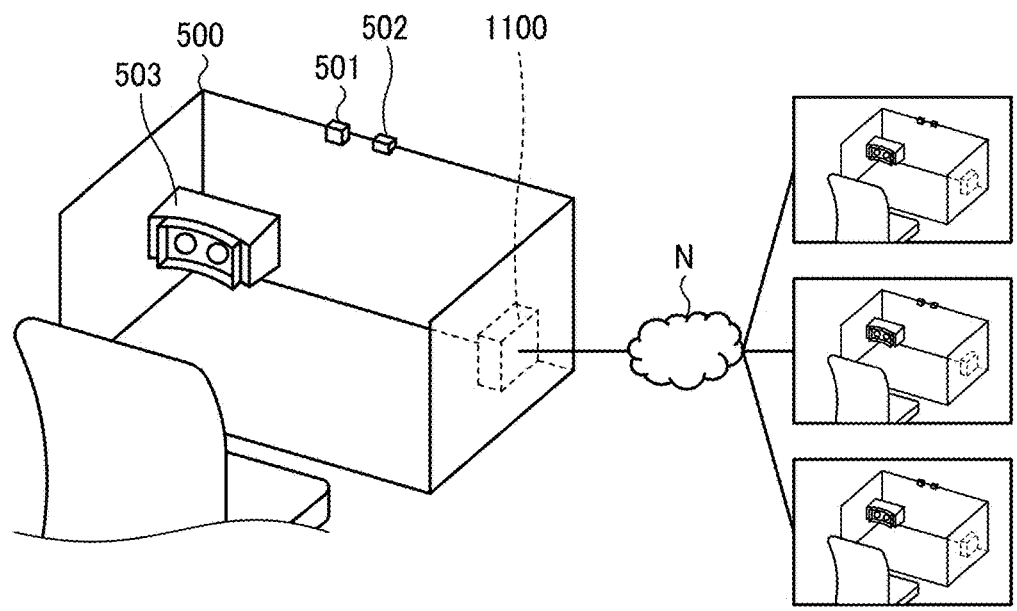
FIG. 16 is a diagram illustrating a fourth example of the usage scene.

FIG. 16 is a diagram illustrating a fourth example of the usage scene. FIG. 16 illustrates another example in which the system is used for the meeting. As illustrated in FIG. 16, a booth 500 for the meeting is provided and each booth 500 is connected to network N by a computer 1100 of each booth 500.

The booth 500 illustrated in FIG. 16 is provided with the computer 1100, a camera 501, and a sensing device 502. A participant wears ahead-mounted display 503 and participates in the meeting. The head-mounted display 503 may be provided with a camera that captures viewpoint of the participant.

Figure 17:
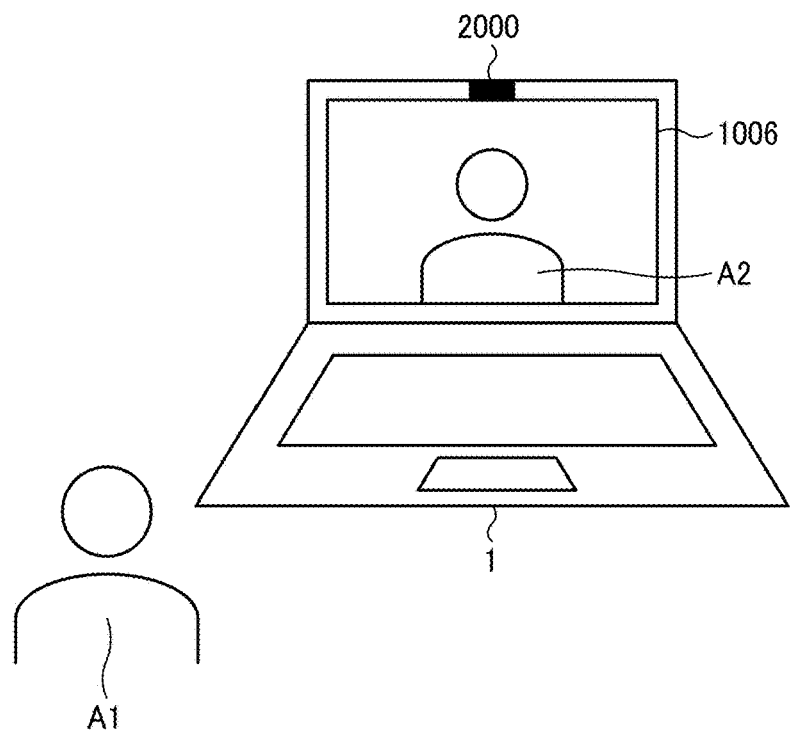
FIG. 17 is a diagram illustrating a first example of output information m1.

FIG. 17 is a diagram illustrating a first example of the output information m1. The information processing apparatus 1 of the participant A1 participating in the conversation receives, through the network N, the output information m1 regarding the attention amount transmitted from the information processing apparatus 1 of the participant A2 participating in the same conversation. The information processing apparatus 1 of the participant A1 changes a light state of a light source 2000 provided in the information processing apparatus 1 of the participant A1 based on the output information m1 regarding the attention amount received from the information processing apparatus 1 of the participant A2. By changing a type of color, blinking interval, or light intensity of the light source 2000 of the information processing apparatus 1 of the participant A1, the participant A1 determines how much attention the participant A2 is paying to what. The kind of attention and the color of light are associated in advance in the information processing apparatus 1 of the participant A1. For example, the color is red when the participant A2 is paying attention to the speech of the participant A1, and when participant A2 is paying attention to visual information of the participant A1 such as body language and facial expressions, the color is green. Also, when the attention amount is large, correspondence is made such that the blinking interval is shortened, or the intensity of light is increased. In addition, since the participant A1 perceives simple output information m1 of changes in light, the attention amount allocated to the output information m1 is reduced, and the participant A1 is able to concentrate on the conversation with the participant A2. In addition, since the color, blinking, and light intensity for transmitting the output information m1 are separated from information such as videos and images that take a relatively long time to process on the information processing apparatus 1, the output information m1 can be transmitted while reducing a delay with respect to the transmission timing determined by the participant A2.

Figure 18:
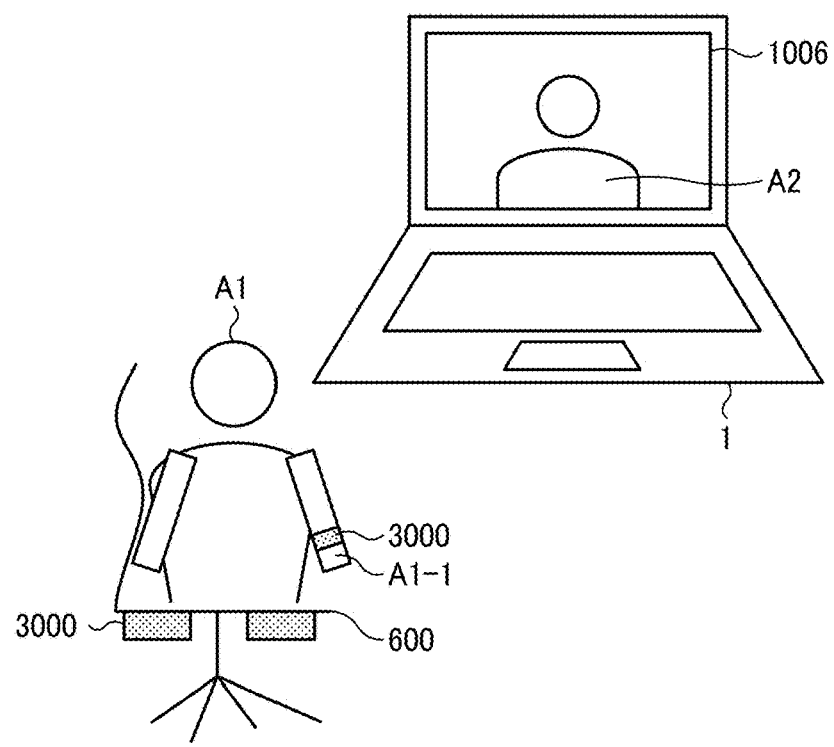
FIG. 18 is a diagram illustrating a second example of the output information m1.

FIG. 18 is a diagram illustrating a second example of the output information m1. As illustrated in FIG. 18, a vibrator 3000 is directly attached to an arm A1-1 of the participant A1, or the vibrator 3000 is attached to a chair 600 on which the participant A1 sits. A vibration of the vibrator 3000 is used as the output information m1.

For example, the information processing apparatus 1 of the participant A1 changes vibration magnitude, frequency, vibration interval, or vibration pattern of the vibrator 3000 of the participant A1. The participant A1 determines what participant A2 is paying attention to by the vibration of the vibrator 3000.

For example, when the participant A2 is paying attention to a speech of the participant A1, the participant A1 is given a vibration with a magnitude corresponding to the change in sound pressure of the speech of the participant A1. Also, when the participant A2 is paying attention to the body language, which is the visual information of the participant A1, the participant A1 is given the vibration of a magnitude corresponding to the magnitude of the body language. By giving the output information m1 in a form of vibration, the attention to the participant A2 and the attention to the speech of the participant A2 are not disturbed, so that the conversation can be smoothly conducted.

Figure 19:
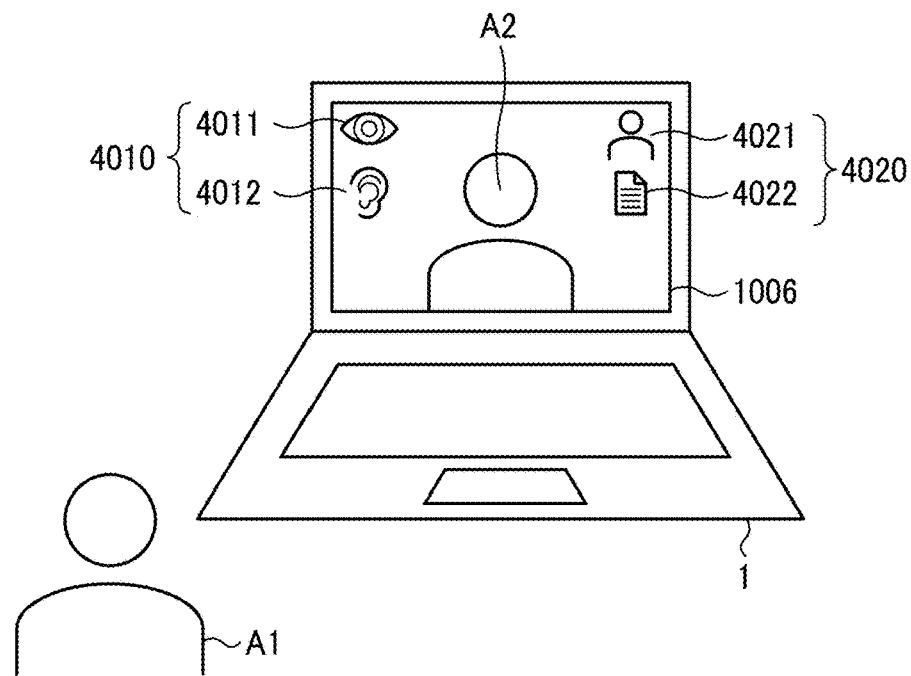
FIG. 19 is a diagram illustrating a third example of the output information m1.

FIG. 19 is a diagram illustrating a third example of the output information m1. As illustrated in FIG. 19, the display 1006 of the information processing apparatus 1 of the participant A1 displays the output information m1 regarding the attention amount of the participant A2 as an icon or the like. For example, a first group of icons 4010 corresponds to sensory organs that the participant A2 is paying attention to, an icon 4011 corresponds to vision, and an icon 4012 corresponds to hearing. A second icon group 4020 corresponds to an object to which the participant A2 is paying attention, an icon 4021 corresponds to the visual information of the participant A1, and an icon 4022 corresponds to materials shared by the participant A1. The materials include voice information and the like, in addition to visually recognizable text information, image information, and video information. When the participant A2 is paying attention to the material visually, at the timing determined by the timing selection mechanism 15, sizes of the icons 4011 and 4022 on the display 1006 become larger than the icons 4012 and 4021. This allows the participant A1 to recognize that the participant A2 is paying attention to the material. By using an icon whose shape itself has a meaning as the output information m1, the participant can instantly and easily grasp the output information m1.

Figure 20:
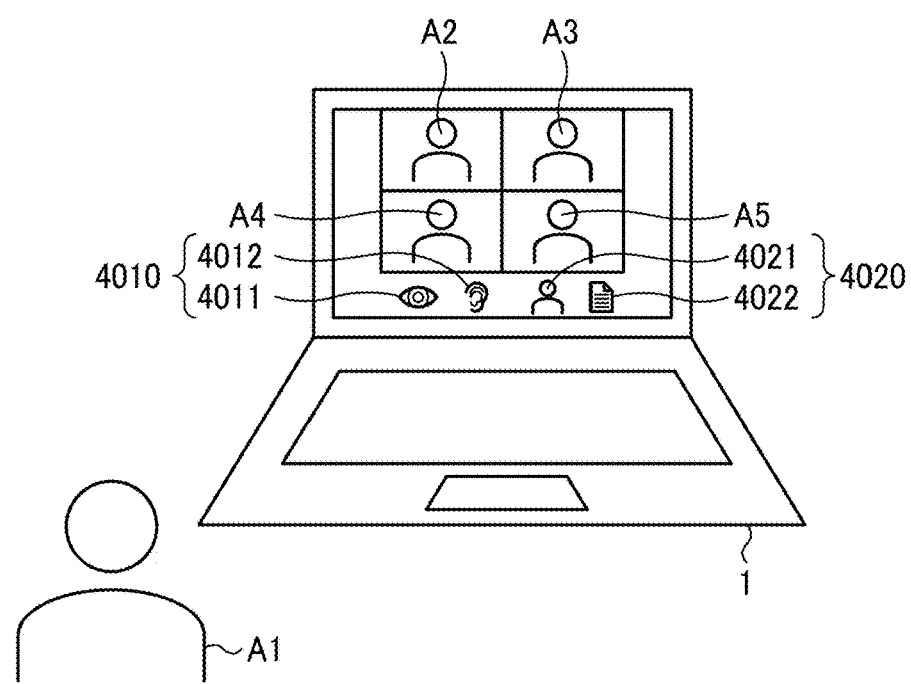
FIG. 20 is a diagram illustrating a fourth example of the output information m1.

FIG. 20 is a diagram illustrating a fourth example of the output information m1. As illustrated in FIG. 20, in a situation such as a lecture in which a participant A1 unilaterally speaks to a plurality of participants A2, A3, A4, and A5, the output information m1 from a plurality of participants is collectively displayed as an icon. For example, when the sensory organs used by the participants other than participant A1 to pay attention to and the target of attention coincides at a certain moment, by changing the size of the corresponding icon 4011, icon 4012, icon 4021, or icon 4022, the participant A1 collectively recognizes the output information m1 relating to representative attention.

In an example where an icon is provided for each participant, the participant A1 is impossible to recognize all the output information m1 at once. On the other hand, according to the fourth example, the participant A1 is able to selectively recognize information commonly output by the plurality of participants and to proceed with the conversation more efficiently.

Figure 21:
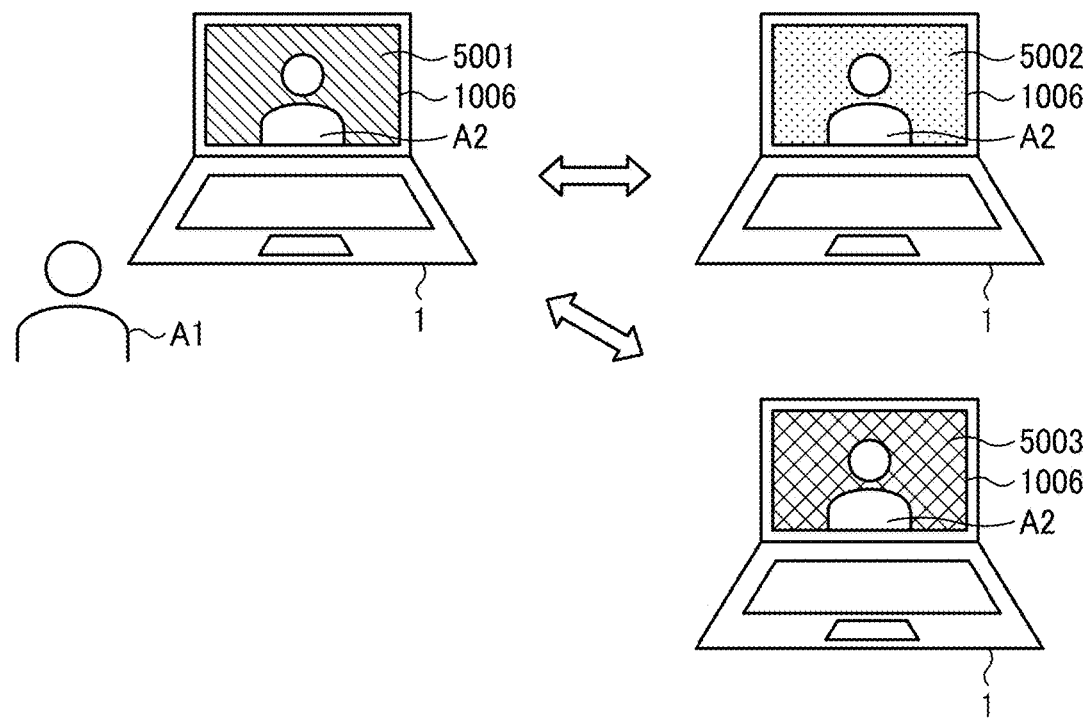
FIG. 21 is a diagram illustrating a fifth example of the output information m1.

FIG. 21 is a diagram illustrating a fifth example of the output information m1. As illustrated in FIG. 21, the output information m1 regarding the attention amount of participant A2 is implemented by temporal and spatial changes in color or a pattern in a background of the participant A2 displayed on the display 1006. As the output information m1 related to the attention amount, for example, a type of color, a shape of the pattern, or an interval between the patterns is changed.

By changing the background 5001 of the participant A2, the participant A1 distinguishes what the participant A2 is paying attention to. For example, the type of attention and the color of the background are associated in advance. When participant A2 is paying attention to the participant A1's speech, red 5002 is used, and when participant A1 is paying attention to body language and facial expressions, which are visual information, green 5003 is displayed. Also, when paying attention to both speech and visual information, color such as blue different from red and green, or mixing red and green on the display 1006 may be used.

According to the example 5, unlike the light source, a two-dimensional color distribution is provided. In addition, in example 5, since an area where the visual change occurs is larger than the light source, the participant A1 is able to recognize the output information m1 easily. Further, in example 5, the attention amount can be grasped using the pattern in addition to the color.

Figure 22:
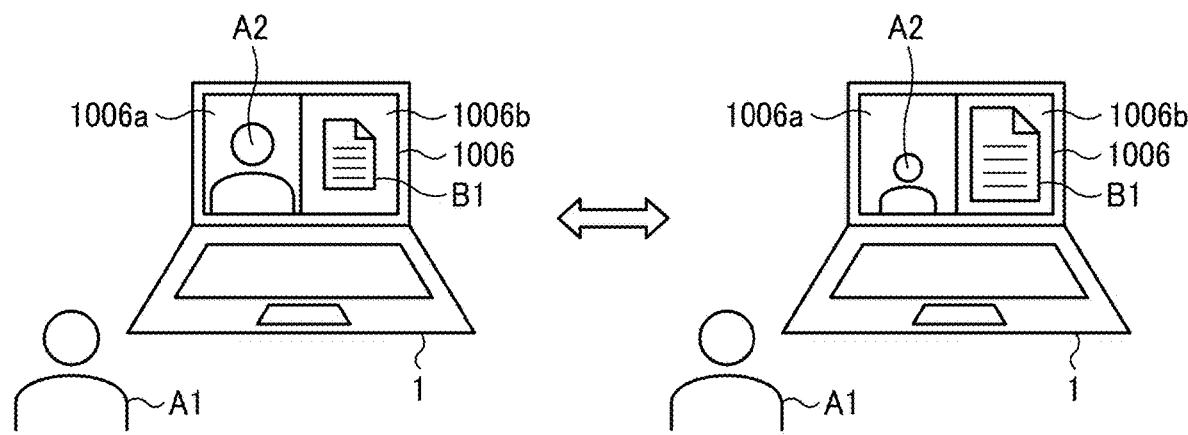
FIG. 22 is a diagram illustrating a sixth example of the output information m1.

FIG. 22 is a diagram illustrating a sixth example of the output information m1. As illustrated in FIG. 22, the visual information of the participant A2 and the materials shared by the participants A1 and A2 are displayed on the display 1006. Areas for displaying respective information (participant display area 1006a and material display area 1006b) are simultaneously provided on the display 1006, and the output information m1 regarding the attention amount of the participant A2 is displayed in the participant display area 1006a and the material display area 1006b. This is implemented by temporally changing width of each area of the display. For example, when the participant A2 is paying attention to the material B1, the area of the material display area 1006b is changed from a normal state. The normal state refers to a state immediately after the conversation is started, and indicates that each display area size is in an initial state. For example, enlarging the material display area 1006b is associated with a fact that the participant A2 is paying attention to the material B1. The material display area 1006b is enlarged as the attention amount paid by the participant A2 to the material B1 increases.

In the sixth example, the participant A1 easily associate the size of the display area with the amount of attention and the target and grasp the output information m1, by visually recognizing the information that is physically larger than the light source and indispensable for conversation. Each display area may be provided by dividing the display area on the display 1006 into a plurality of areas, or may be displayed in such a manner that one area overlaps another area.

Figure 23A:
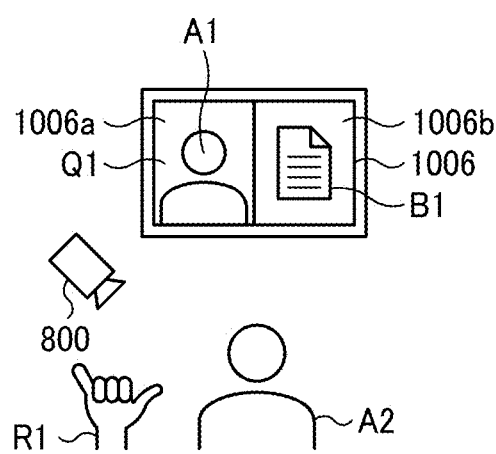
FIGS. 23A and 23B are diagrams illustrating an example of detecting a body motion (gesture) to select a timing selection mechanism.
Figure 23B:
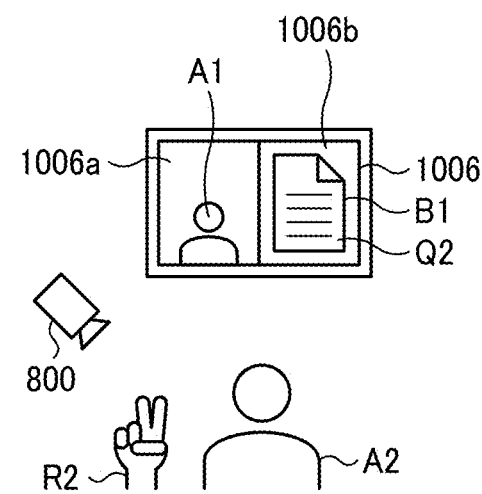

FIGS. 23A and 23B are diagrams illustrating an example of detecting a body motion (gesture) to select a timing selection mechanism 15. Assume that the participant A2 is paying attention to the participant A1 or the material B1 displayed on the display 1006. For example, a motion or shape of a hand corresponding to the participant A1 as the target of attention is determined in advance as a sign R1, and the motion or shape of the hand corresponding to the material B1 as the target of attention is determined in advance as a sign R2. The participant A2 changes the shape of participant A2's hand to the sign R1 or sign R2. A change in hand shape is detected by a detector 800, such as a camera, light detection and ranging (LiDAR), radio detection and ranging (RADAR), or speckle imaging, and transmits the output information m1 to the participant A1. The information transmitted to the participant A1 includes information about what the participant A2 is paying attention to, and this information varies according to the shape of the participant A2's hand. When the shape of the hand is the sign R1, the participant A2 is paying attention to the participant A1, and when the shape of the hand is the sign R2, the participant A2 is paying attention to the displayed material B1. The type of change in the hand is not limited to the shape of the hand, and temporal changes in a position of the hand may be added.

FIGS. 24A-1 to 24B-3 are diagrams illustrating an example relating to a speaking time threshold of the manual timing selection mechanism 15-1. FIGS. 24A-1 to 24A-3 illustrate the speaking time of the participants A1 and A2 for each time interval and the sum of the speaking time of the participants A1 and A2 for each time interval.

When the sum of the speaking time exceeds a certain threshold, indication is that the participants are conversing while paying attention to each other's speech information to some extent. When the threshold value t1 is exceeded, the output information m1 is transmitted to the participant, which indicates that the participant is paying attention to the speech. The participants recognize that the conversation is progressing smoothly and are conscious of maintaining the conversation. Subsequently, by setting a plurality of thresholds such as the threshold t2 and transmitting the output information m1 to the participants, the participants can have a conversation while paying attention to each other's speech. In a situation such as creative problem-solving where participants A1 and A2 exchange many opinions with each other and create ideas, communication is enhanced by making the participants aware that the participants are paying attention to each other's speech. As a result, communication is accelerated and improved.

Note that a number of thresholds to be provided is not limited to two. Also, the threshold may not be constant and may be changed according to the purpose of the conversation and the number of participants.

On the other hand, FIGS. 24B-1 to 24B-3 illustrate an example of calculating an accumulated speaking time difference for each time interval between participant A1 and participant A2. In a case the accumulated speaking time difference falls below a certain threshold, indication is that the participant A2, who has less speaking time turned to a listener and paying attention to the speech of the participant A1, and the attention amount is large. When the accumulated speaking time difference falls below a certain threshold, the participant A2 transmits the output information m1 indicating that the participant A2 is paying attention to the speech of the participant A1. In a situation such as a business conversation where a seller and a buyer of goods are negotiating, by making the seller aware that the seller corresponding to the participant A2 listens more to the buyer corresponding to the participant A1, communication becomes smooth and probability of success in negotiations and contract is increased.

Note that the number of thresholds is not limited to one. Also, the threshold may not be constant and may be changed according to the purpose of the conversation and the number of participants.

Each function of the embodiment and each modified example may be provided by being implemented in an application specific integrated circuit (ASIC), or may be provided by causing a computer to execute a program. In the latter case, a program can be installed in advance in a ROM. HDD, or the like, and provided as a functional unit. In this case, the CPU reads and executes the program step by step to implement various functional units.

Also, the program may be recorded on a computer-readable recording medium and provided as a computer program product. For example, a file in an installable format or an executable format may be recorded and provided on a recording medium such as a flexible disk, a compact disc-recordable (CD-R), a digital versatile disk (DVD), a Blu-ray Disc (registered trademark), and a semiconductor memory, for distribution.

Further, the programs may be stored on a computer connected to a network such as the internet and provided by downloading the program through the network. Also, the programs executed in the embodiment and each modified example may be configured to be provided or distributed through a network such as the internet.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising:
circuitry configured to:
acquire participant information related to a particular participant of a plurality of participants acquired from the plurality of participants participating in communication, acquired from the particular participant of the plurality of participants participating;
acquire attention amount information related to an attention amount of the particular participant of the plurality of participants with respect to information used in the communication;
determine presentation information to be presented to the particular participant of the plurality of participants based on the attention amount information, the presentation information indicating, via an icon, a sensory organ corresponding to the attention amount of the particular participate with respect to the information used in the communication, the icon representing the sensory organ;

adjust timing for transmitting the presentation information to one or more other participants in the plurality of participants; and transmit the presentation information to an output device provided for each of the plurality of participants, wherein the circuitry is configured to present a recommendation for the timing of transmitting the presentation information to the one or more other participants based on participant information related to the particular participant and the attention amount information related to the particular participant.

2. The information processing apparatus of claim 1, wherein the participant information includes at least one of biological information, audio information, or video information relating to the particular participant.

3. The information processing apparatus of claim 1, wherein the circuitry is configured to determine timing of transmitting the presentation information to the one or more other participants based on an operation of the particular participant.

4. The information processing apparatus of claim 1, wherein the circuitry is configured to determine the timing of transmitting the presentation information to the one or more other participants based on the timing when the attention amount information related to the particular participant exceeds a predetermined threshold.

5. The information processing apparatus of claim 4, wherein the attention amount information is an amount related to time that the particular participant continuously gazed at image information of the one or more other participants.

6. The information processing apparatus of claim 4, wherein the information used in the communication includes at least one of text information, image information, and video information, and the attention amount information is an amount related to the time that the participant continuously gazed at at least one of the text information, the image information, and the video information.

7. The information processing apparatus of claim 1, wherein the circuitry is configured to determine, based on information indicating detection of a body motion of the particular participant, the timing of transmitting the presentation information to the one or more other participants being associated with the detected body motion in advance.

8. The information processing apparatus of claim 1, wherein
the information used in the communication includes voice information of the plurality of participants;
the participant information includes information related to speaking time of the plurality of participants; and
the attention amount information is obtained based on the speaking time of the particular participant and the speaking times of the one or more other participants.

9. The information processing apparatus of claim 1, wherein the circuitry is further configured to:
acquire a plurality of items of the participant information from the particular participant; and
obtain a plurality of items of the attention amount information in a predetermined time interval, based on the plurality of items of participant information in the predetermined time interval, and a valid number, the valid number being a number of items of the participant information determined to be valid based on a predetermined threshold value for each of the participant information in the predetermined time interval.

10. The information processing apparatus of claim 2, wherein the biological information of the particular participant is information related to line of sight of the particular participant.

11. The information processing apparatus of claim 1, wherein the circuitry is further configured to determine based on a selection of timing by the particular participant, whether to transmit the presentation information at first timing determined based on an operation of the particular participant, or second timing determined based on the participant information related to the particular participant or the attention amount information related to the particular participant.

12. The information processing apparatus of claim 1, further comprising a sensor for acquiring the participant information.

13. An information processing system comprising:
a plurality of information processing apparatuses connected to communicate with each other, each apparatus being the information processing apparatus of claim 1;
a sensor communicably connected with each information processing apparatus for acquiring the participant information; and
an output device communicably connected with each information processing apparatus.

14. A communication support system comprising:
the information processing system of claim 13, and
wherein the plurality of information processing apparatuses each configured to mutually transmit and receive information used in the communication.

15. An information processing method comprising:
acquiring participant information related to a particular participant of a plurality of participants in communication acquired from the particular participant of the plurality of participants;
acquiring attention amount information related to an attention amount of the particular participant of the plurality of participants with respect to information used in the communication;
determining presentation information to be presented to the plurality of participants based on the attention amount information of the particular participant, the presentation information indicating, via an icon, a sensory organ corresponding to the attention amount of the particular participate with respect to the information used in the communication, the icon representing the sensory organ;
adjusting timing for transmitting the presentation information to one or more other participants of the plurality of participants; and
transmitting the presentation information to an output device provided for each of the plurality of participants,
wherein in adjusting the timing for transmitting the presentation information, the method further comprises presenting a recommendation for the timing of transmitting the presentation information to the one or more other participants based on participant information related to the particular participant and the attention amount information related to the particular participant.

16. A non-transitory recording medium which, when executed by one or more processors on an information processing apparatus, causes the processors to perform an information processing method comprising:
acquiring participant information related to a particular participant of a plurality of participants in communication acquired from the particular participant of the plurality of participants;

acquiring attention amount information related to an attention amount of the particular participant of the plurality of participants with respect to information used in the communication;

determining presentation information to be presented to the plurality of participants based on the attention amount information of the particular participant, the presentation information indicating, via an icon, a sensory organ corresponding to the attention amount of the particular participate with respect to the information used in the communication, the icon representing the sensory organ;

adjusting timing for transmitting the presentation information to one or more other participants of the plurality of participants; and transmitting the presentation information to an output device provided for each of the plurality of participants, wherein in adjusting the timing for transmitting the presentation information, the method further comprises presenting a recommendation for the timing of transmitting the presentation information to the one or more other participants based on participant information related to the particular participant and the attention amount information related to the particular participant.

17. The information processing apparatus of claim 1, wherein the circuitry presents the recommendation for the timing of transmitting the presentation information to the one or more other participants in a case that the participant information related to the particular participant and the attention amount information related to the particular participant indicate that a current timing for transmitting the presentation information is not optimal.

18. The information processing apparatus of claim 17, wherein the recommendation for the timing of transmitting the presentation information includes a recommendation to manually adjust the timing of transmitting the presentation information.

19. The information processing apparatus of claim 1, wherein the circuitry further adjusts the timing for transmitting the presentation information based on manual participant input.

* * * * *